(12) United States Patent
Furukawa et al.

(10) Patent No.: US 11,390,765 B2
(45) Date of Patent: Jul. 19, 2022

(54) RECORDING LIQUID AND PRINTED MATTER

(71) Applicant: RICOH COMPANY, LTD., Tokyo (JP)

(72) Inventors: Juichi Furukawa, Kanagawa (JP); Tatsuya Tomura, Tokyo (JP)

(73) Assignee: RICOH COMPANY, LTD., Toyko (JP)

( * ) Notice: Subject to any disclaimer, the term of this patent is extended or adjusted under 35 U.S.C. 154(b) by 0 days.

(21) Appl. No.: 16/739,193

(22) Filed: Jan. 10, 2020

(65) Prior Publication Data
US 2020/0224048 A1 Jul. 16, 2020

(30) Foreign Application Priority Data

Jan. 11, 2019 (JP) .............................. JP2019-003360

(51) Int. Cl.
| | | |
|---|---|---|
| *C09D 11/322* | (2014.01) | |
| *C09D 11/102* | (2014.01) | |
| *B41J 2/01* | (2006.01) | |
| *B41J 2/21* | (2006.01) | |
| *C09D 11/40* | (2014.01) | |
| *C09D 11/54* | (2014.01) | |

(52) U.S. Cl.
CPC .............. *C09D 11/322* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2/04588; B41J 2/04595; B41J 2/04586; B41J 2/14274; C09D 11/36; C09D 11/40; C09D 11/30;
(Continued)

(56) References Cited

U.S. PATENT DOCUMENTS

| | | | |
|---|---|---|---|
| 2004/0141041 A1* | 7/2004 | Tsutsumi | ............... B41J 11/002 347/102 |
| 2007/0082977 A1* | 4/2007 | Shibahashi | ............ C09D 11/50 523/161 |

(Continued)

FOREIGN PATENT DOCUMENTS

| | | |
|---|---|---|
| JP | 2004-256722 | 9/2004 |
| JP | 2008-297323 | 12/2008 |

(Continued)

*Primary Examiner* — Manish S Shah
(74) *Attorney, Agent, or Firm* — Grüneberg and Myers PLLC

(57) ABSTRACT

A recording liquid contains a luster pigment having a mean number diameter of less than 200 nm and a modified ethylene vinyl acetate polymer or the combination of a polyamide amine salt and an aliphatic acid amide, wherein the recording liquid has a viscosity of 40 mPa·s or less at 20 degrees C.

8 Claims, 2 Drawing Sheets

(52) U.S. Cl.
CPC ............ *C09D 11/102* (2013.01); *C09D 11/40* (2013.01); *C09D 11/54* (2013.01)

(58) Field of Classification Search
CPC ....... C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 2007/0151478 A1* | 7/2007 | Erk | C09B 5/62 106/31.6 |
| 2014/0333696 A1* | 11/2014 | Nagase | B41J 2/01 347/20 |
| 2015/0071973 A1* | 3/2015 | Fujii | C09C 3/08 424/401 |
| 2015/0252153 A1* | 9/2015 | Kubo | C09C 1/644 524/437 |
| 2016/0264808 A1* | 9/2016 | Kido | C09D 11/322 |
| 2018/0056692 A1 | 3/2018 | Tomura et al. | |
| 2018/0094155 A1 | 4/2018 | Fujita et al. | |
| 2018/0118966 A1 | 5/2018 | Tomura et al. | |
| 2018/0178538 A1 | 6/2018 | Miyazawa et al. | |
| 2018/0186945 A1* | 7/2018 | Kubo | C09C 3/08 |
| 2019/0010331 A1 | 1/2019 | Fujita et al. | |
| 2019/0030940 A1 | 1/2019 | Tomura et al. | |
| 2019/0276692 A1 | 9/2019 | Furukawa et al. | |

FOREIGN PATENT DOCUMENTS

| | | |
|---|---|---|
| JP | 2011-241240 | 12/2011 |
| JP | 2012-200873 | 10/2012 |
| JP | 2012-206358 | 10/2012 |
| JP | 2013-082209 | 5/2013 |
| JP | 2017-155206 | 9/2017 |

* cited by examiner

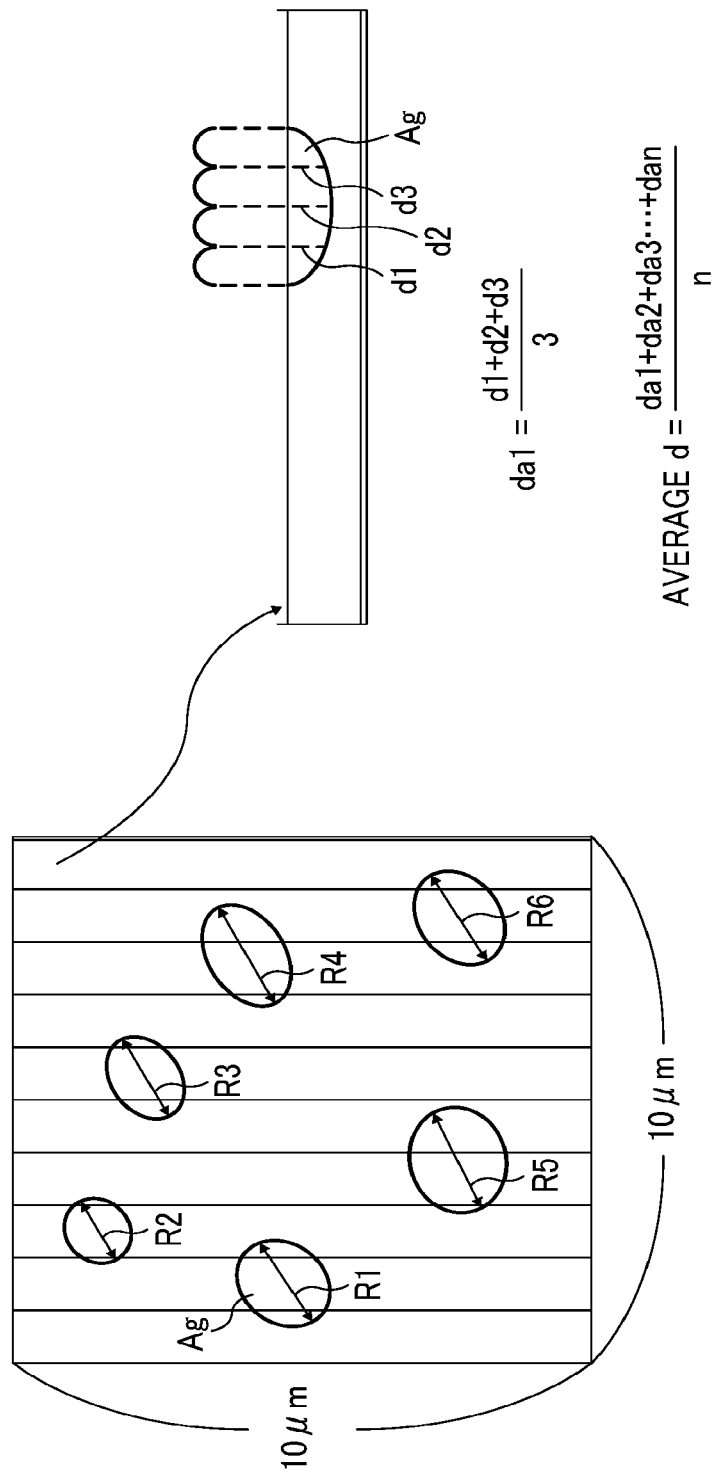

RECORDING LIQUID AND PRINTED MATTER

CROSS-REFERENCE TO RELATED APPLICATIONS

This patent application is based on and claims priority pursuant to 35 U.S.C. § 119 to Japanese Patent Application No. 2019-003360, filed on Jan. 11, 2019 in the Japan Patent Office, the entire disclosure of which is hereby incorporated by reference herein.

BACKGROUND

Technical Field

The present invention relates to a recording liquid and printed matter.

Description of the Related Art

Printing media are diversifying. In consequence, printing media are now used in many fields, from printing in office to large-scale printing such as commercial printing. Printed matter including the printing medium can represent a full color image obtained by mixing various colors on the printing medium.

Printed matter having a metallic luster image including a silver coloring material, which particularly has a mirror surface with excellent image clarity, is widely applicable and valuable in industrial fields because a full color image having a high image clarity can be obtained with the silver coloring material mixed with other colors.

SUMMARY

According to embodiments of the present disclosure, provided is a recording liquid which contains a luster pigment having a mean number diameter of less than 200 nm and a modified ethylene vinyl acetate polymer or the combination of a polyamide amine salt and an aliphatic acid amide, wherein the recording liquid has a viscosity of 40 mPa·s or less at 20 degrees C.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 3 is a diagram illustrating a method of obtaining an average thickness d of a tabular pigment.

Figure 1:
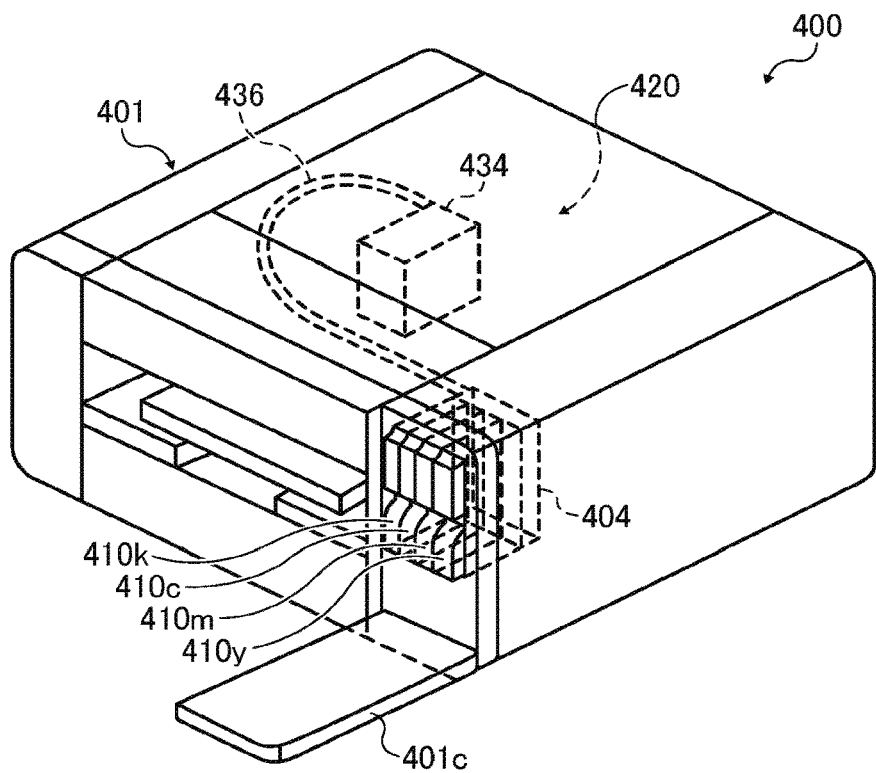
FIG. 1 is a diagram illustrating a perspective view of an example of a recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, provided is a recording liquid which can produce printed matter with a high level of glitter while having color hue (*a,*b) close to (0,0) and further can be stably discharged in an inkjet method.

A method of printing an ink composition containing small silver particles on the surface of a substrate to obtain printed matter having a high level of gloss has been proposed in JP-2012-200873-A1 and JP2012-206358-A1.

In addition, a method of enhancing fixability by causing an ink to contain 0.5 to 8 percent by mass polymer particles and wax particles has been proposed in JP-2013-82209-A1.

Moreover, a method has been proposed in JP-2011-241240-A1 which enhances dispersibility with silver ink having a silver particle diameter in such a manner that d90 is from 50 nm to 1 μm, d10 is from 2 to 20 nm, and d50 is from 10 to 100 nm and demonstrates good metallic luster and abrasion resistance when the silver ink is attached to a recording medium.

Moreover, a method has been proposed in JP-2004-256722-A1 which obtains a high level of gloss by inclusion of colloid particles selected from gold, silver, platinum, and copper as colorant and a dispersant in a metallic luster ink composition for pens and pencils.

Next, embodiments of the present disclosure are described.

The present disclosure relates to the following 1 and also includes the following 2 to 9 as embodiments.

1. A recording liquid contains a luster pigment having a mean number diameter of less than 200 nm and a modified ethylene vinyl acetate polymer or a combination of a polyamide amine salt and an aliphatic acid amide, wherein the recording liquid has a viscosity of 40 mPa·s or less at 20 degrees C.

2. The recording liquid according to 1 mentioned above, wherein the luster pigment accounts for 1 to 10 percent by mass of the recording liquid.

3. The recording liquid according to 1 or 2 mentioned above, wherein the mass ratio of the modified ethylene vinyl acetate polymer or the combination of the polyamide amine salt and the aliphatic acid amide to 100 parts by mass of the luster pigment is from 0.1 to 6 parts by mass.

4. The recording liquid according to any one of 1 to 3, wherein the luster pigment contains a metal pigment.

5. The recording liquid according to 4 mentioned above, wherein the metal pigment contains a tabular pigment.

6. The recording liquid according to 5 mentioned above, wherein the ratio (R/d) of an average particle diameter R to an average thickness d of the tabular pigment is greater than 5, wherein R is obtained as follows: each of the tabular pigment in a 10 μm×10 μm photographed image out of a solid image printed with the recording liquid is subject to circle fitting, in which 16 compass points are placed on an outer circumference of a circumcircle of each of the tabular pigment to obtain a particle diameter thereof and calculate an average of the particle diameter as R.

7. The recording liquid according to any one of 1 to 6, further contains resin particles having a mean number diameter of from 10 to 50 nm.

8. The recording liquid according to any one of 1 to 7, further contains a silicone-based surfactant.

9. Printed matter contains a recording medium having a surface roughness Ra of 50 nm or less and a printed layer of the recording liquid of any one of 1 to 8 mentioned above on the recording medium.

The present inventors have found that it is possible to produce highly glossy printed matter while having a color hue (a*, b*) close to (0,0) with a recording liquid contains a luster pigment having a small mean number diameter (number average particle diameter) less than 200 nm and a modified ethylene vinyl polymer or a polyamide amine salt and an aliphatic acid amide and has a viscosity of 40 mPa·s or less at 20 degrees C. and the recording liquid can be stably discharged in an inkjet method to produce printed matter.

Although a recording liquid containing a luster pigment having a mean number diameter of less than 200 nm are highly glittery, such a typical pigment causes waviness with a cycle of less tan 200 nm on a printed layer, thereby optically exhibiting a structural color. Due to this the waviness cycle, silver is not exhibited but gold, copper, and bronze. The waviness cycle changes depending on the types of recording media. For example, different color hues are exhibited depending on printing on gloss paper, vinyl chloride, and polyethylene terephthalate (PET).

Due to optical characteristics ascribable to the form of a printed layer stemming from the diameter of pigment particle, the reflection has a structural color, so that printed matter exhibits a color hue not recognizable as silver. This causes a poor result when producing printed matter expressing multi-color and color gradation by, in particular, dot patterns and mixing with other colors, for example, in an inkjet method. The color channel (a*, b*) is preferably as close as possible to (0,0).

Due to the form of a luster pigment having a small mean number diameter of less than 200 nm, a high level of glittering and sufficient discharging stability can be secured. The mean number diameter of the luster pigment is preferably 10 nm or more. When the mean number diameter of the luster pigment is 10 nm or more, luster can be improved. In addition, if the luster pigment contains a shear thinning agent such as the modified ethylene vinyl acetate polymer or the combination of a shear thinning agent and the polyamide amine salt, which have a hydrophilic portion and/or a hydrophobic portion, the color hue (a*, b*) is close to silver. The ranges of a* value and b* value are preferably from around −5.0 to around +2.0 and around −10 to around +3.0, respectively. A preferable color gamut is a range of champagne gold to silver to platinum to light blue metallic. The hue is more preferably in the range on a slightly cool side, which is perceived as white to blue-white. It is difficult to recognize warm color hue of yellow to red as silver because such warm color hue is perceived as gold to copper.

Further, discharging stability can be secured by adjusting the solvent/solid ratio and the type of the recording liquid as described above and setting a viscosity at 20 degrees C. to 40 mPa·s or less. Although the mechanism is not clear, it was found that as the viscosity lowered, the hue is improved. The viscosity can be controlled by reducing the solvent ratio, etc. A solvent for increasing the viscosity may degrade the hue of the recording liquid. At a solvent concentration/solid resin concentration exceeding 40 mPa·s, the proportion of the components other than the contained pigment is high, so that the hue does not become silver.

To produce printed matter by discharging aqueous or oil-based recording liquid in an inkjet method, the viscosity is preferably from 1 to 40 mPa·s at 20 degrees C. When the viscosity is 1 mPa·s or greater, it is possible to contain a highly concentrated coloring material with which printed matter having sufficient glossiness can be obtained. When the viscosity is higher than 40 mPa·s, it is not possible to obtain sufficient discharge stability with a typical inkjet head because its discharging power is usually small.

The concentration of the luster pigment in the recording liquid is preferably from about 1 to about 10 percent by mass. When the concentration is 1 percent by mass or greater, sufficient luster can be obtained. When it is 10 percent by mass or less, the viscosity does not become excessively high, so that discharging stability is enhanced and it is possible to strike a balance between abrasion resistance and luster.

The recording liquid of the present disclosure contains from 0.1 to 6 parts by mass of the modified ethylene vinyl acetate polymer or the polyamide amine salt and aliphatic acid amide to 100 parts by mass of the pigment. If it is 0.1 parts or greater, the hue is improved. If it is 6 parts by mass or less, luster is not impaired and the hue is improved. The optimum content is within the above-mentioned range. It changes depending on the pigment particle diameter and the pigment form.

The luster pigment of the recording liquid of the present disclosure preferably a metal pigment. Such a metal pigment imparts a high level of luster and a high level of image clarity.

In general, for a spherical pigment, as the particle diameter decreases, the level of luster increases. However, if the metal pigment is tabular, good smoothness can be obtained even for a relatively large pigment. That is, high level of luster can be obtained. The color hue is closer to (0,0) as the mean number diameter approaches 200 nm. Therefore, a small mass ratio of the modified ethylene vinyl acetate polymer or the polyamide amine and the aliphatic acid amide will suffice. That is, while obtaining a high level of luster, the hue becomes closer to (0,0).

The ratio (R/d) of the average particle diameter (average diameter of tabular pigment) R of the tabular pigment to the average thickness d thereof is preferably greater than 5.

As the R/d increases, the printed surface on which the pigment is spread becomes flat, thereby increasing luster and image quality. In order to secure discharging stability, the R is preferably 700 nm or less. The d is preferably 80 nm or less. Further, d is preferably from about 10 to about 50 nm because the level of luster becomes high. When the thickness is 50 nm or less, Ra of the printed layer does not become too large, which is preferable. When the thickness is 10 nm or greater, the pigment does not transmit a great amount of incident light, so that the phenomenon (FLIP FLOP) of the hue looking different depending on the viewing angle does not occur.

The R and the d of the tabular pigment can be measured by, for example, the following method:
- Directly measure the dimension of a pigment found in a scanning electron microscope (SEM) image.
- Directly measure the dimension of the pigment from a cross-section photograph with transmission electron microscope (TEM).
- Dilute the recording liquid with propylene glycol, etc., dry it on a flat glass plate, prepare an ink layer in such a manner that the pigment is placed in order not to be overlapped with each other, and measure the step as the thickness between the pigment and the background with atomic force microscope (AFM).

In the present disclosure, the dimensions of the pigment are directly measured from the cross-section photograph with TEM.

Each of tabular pigment such as silver in a 10 μm×10 μm photographed image out of a solid image printed with the recording liquid is subject to circle fitting, in which 16 compass points are placed on an outer circumference of a circumcircle of each of the tabular pigment to obtain a particle diameter thereof and calculate an average of the particle diameter as R. The outer peripheral points are contact points of 16 compass points from the center of the circumcircle. The particle diameter of the tabular pigment found in the image of 10 μm×10 μm is obtained and the average is calculated as the R.

Next, how to obtain the average thickness d is illustrated in FIG. 3 The thickness of the pigment observed in each of the cross sections of a 10 μm×10 μM solid image separated into ten is obtained and the average thereof is determined as the d. For the pigment present in the cross section, each sample of the sample a1 to an is equally divided into four along the cross-section direction and the averages da1 to dan of thicknesses d1, d2, and d3 in the three cross sections are obtained. Thereafter, the average of these averages da1 to dan are calculated and determined as the d.

As described above, the average plate diameter R and the average thickness d were independently obtained to obtain the R/d.

The recording liquid of the present disclosure preferably contains resin particles having a mean number diameter of from 10 to 50 nm.

Inclusion of such resin particles imparts fixability to a recording medium to the recording liquid. In order to impart fixability while the pigment particle diameter is kept less than 200 nm, the mean number diameter of the resin particle is from 10 to 50 nm. If the mean number diameter is 10 nm or greater, conductivity between pigments does not decrease and it is easy to demonstrate glossiness. If it is 50 nm or less, the recording liquid easily spreads between the pigments, thereby enhancing fixability.

The recording liquid of the present disclosure preferably contains a silicone-based surfactant. The recording liquid can obtain a low surface tension even with a small amount of such a silicone-based surfactant. When such a recording liquid is discharged and landed, it spreads thinly and widely on the recording medium. Since the leveling property is good, the recording liquid can obtain a high level of glossiness. In addition, since the surfactant basically remains in a printed layer as a non-volatile component and prevents the appearance of luster, it is preferable that the amount of the surfactant in the recording liquid be small in order to obtain a high level of glossiness. For this reason, it is preferable to contain a small amount of a silicone-based surfactant in order to obtain the minimum wettability.

Highly glossy printed matter can be obtained when the recording liquid of the present disclosure is applied to a flat recording medium having a surface roughness Ra of 50 nm or less. The lowness of the Ra of the printed layer relates to the level of luster and the Ra of the printed layer is affected by the Ra of the underlying recording medium.

Further, under the presence of an ink receiving layer such as silica, the hue tends to be close to silver.

Hereinafter, the luster pigment, the modified ethylene vinyl acetate polymer, the polyamide amine salt and the aliphatic acid amide, the organic solvent, water, the resin, the additives, etc. used in the recording liquid will be described.

Luster Pigment

The recording liquid according to this embodiment contains a luster pigment. As the luster pigment contained in the recording liquid, any pigment can be used as long as droplets of the recording liquid can be discharged by an inkjet recording method. The luster pigment imparts luster (gloss) to a resin ink layer when the recording liquid is applied thereto. In addition, it can impart luster to an attached material. Examples of such a luster pigment include, but are not limited to, a pearl pigment and metal particles. Representative examples of the pearl pigment include, but are not limited to, pigments having pearly luster or interference luster, such as titanium dioxide-coated mica, fish scale foil, and bismuth oxychloride. Specific examples of the metal particles include, but are not limited to, particles of aluminum, silver, gold, silver, nickel, chromium, tin, zinc, indium, titanium, copper, etc. Particles made of at least one member selected from the group consisting of such elementary metals, alloys thereof, and mixtures thereof may be used. The luster pigment for use in this embodiment is practically effective irrespective of the type of pearl pigments or metal particles. However, it is preferable to use silver particles in terms of the level of luster. Hereinafter, a silver ink is described below as a specific example of the recording liquid containing a luster pigment.

Silver Particle

With silver particles, an image having excellent metallic luster can be formed.

The proportion of the silver particle in an ink is preferably from 1 to 10 percent by mass and more preferably from 2 to 7 percent by mass. When the proportion is 1 percent by mass or more, sufficient luster is obtained. When it is 10 percent by mass or less, the discharging stability of the ink ameliorates, thereby striking a balance between abrasion resistance and luster.

Tabular Silver Particle

The silver particles may be tabular (or flaky) particles. Since the flaky metal particles overlap with each other with a large contact area when a printed layer is formed, they easily conduct electricity. That is, it is easy to obtain a metallic luster and possible to create printed matter with excellent image clarity and luster.

The flaky metal particles may be prepared by any method. For example, as described in JP-6180769-B1 (JP-2014-196527-A1), impurities are removed from a liquid mixture of an aqueous solution of silver nitrate and an aqueous solution of oxalic acid to obtain a liquid mixture of oxalic acid and silver, thereafter, a carrier (for example, hydrophilic liquid such as polyethylene glycol (dispersant), alcohols, and two or more kinds are also allowed simultaneously) is added to the liquid mixture of oxalic acid and silver, the resulting mixture is subject to ultrasonic wave to obtain a liquid dispersion of silver oxalate, which is heated at 150 degrees C. under a pressure of 0.5 MPa in an autoclave and stirred at 150 rpm for 30 minutes to obtain a liquid dispersion containing flaky fine particles mainly composed of silver. The arithmetic mean deviations of profiles Ra of the obtained flaky micro particles is 10 nm or less. When the silver oxalate is decomposed by heat and the silver particles are precipitated, silver oxalate and the carrier or an organic compound derived from a dispersant are attached. The resulting material is furthermore chemically bonded with the silver particle.

Micro particles having an arithmetic mean deviations of profiles Ra of 10 nm or less can be obtained by: for example,
(1) The concentration of silver oxalate in the dispersion is set within a predetermined range;
(2) Use a specific dispersant;
(3) Set the pressure during heating to a specified range; and
(4) Set the rate of stirring in a predetermined range.

The arithmetic mean roughness Ra is measured by an atomic force microscope (AFM). The AFM is a type of scanning probe microscope. The AFM has a cantilever and a probe mounted onto the tip of the cantilever. This probe scans the surface of a microparticle. The cantilever is vertically displaced by the force acting between atoms of the sample and the probe. This displacement is measured.

In the present disclosure, for instance, "SPM-9600" manufactured by Shimadzu Corporation is used as the AFM. The measurement conditions are as follows:
 Mode: Contact mode;
 Cantilever: OMCL-TR 800PSA-1 manufactured by Olympus Corporation;
 Resolution: 512×512 pixels;
 Height resolution: 0.01 nm; and
 Lateral resolution: 0.2 nm.
 Dispersant A preferred dispersant for the flaky metal particle is a glycol-based dispersant. Due to the liquid dispersion containing a glycol-based surfactant, particles having a sharp particle size distribution can be obtained. From this liquid dispersion, particles having a small arithmetic average roughness Ra are obtained. From this liquid dispersion, particles having a large aspect ratio (D50/Tave) can be obtained. Furthermore, the particles produced from this liquid dispersion are sufficiently dispersed in a solvent. A particularly preferred dispersant is polyethylene glycol.

The pressure during the decomposition reaction of silver oxalate is preferably higher than the atmospheric pressure. By the decomposition reaction in this atmosphere, particles having a sharp particle size distribution can be obtained. Moreover, from this decomposition reaction in this atmosphere, particles having a small arithmetic average roughness Ra are obtained. From these points of view, this pressure is preferably 2 $kgf/cm^2$ or higher. This pressure is preferably 10 $kgf/cm^2$ or less.

The rate of stirring during the decomposition of silver oxalate is preferably 100 rpm or more. Aggregation of the microparticles is reduced at a rate of stirring of 100 rpm or more. Therefore, particles having a sharp particle size distribution can be obtained. Furthermore, particles having a large aspect ratio (D50/Tave) can be obtained at a rate of stirring of 100 rpm or more. From these points of view, the rate of stirring is preferably 130 rpm or more. The rate of stirring is preferably 1000 rpm or less.

The temperature of the liquid dispersion during the decomposition of silver oxalate is preferably 100 degrees C. or higher. At 100 degrees C. or higher, the reaction is completed in a short time in a liquid dispersion. From this point of view, the temperature is particularly preferably 120 degrees C. or higher. From energy cost point of view, this temperature is preferably 150 degrees C. or lower.

Examples of the solvents for dispersoid include, but are not limited to, alcohols such as aliphatic acid alcohols, alicyclic alcohols, aromatic aliphatic alcohols, and polyhydlic alcohols, glycol ethers such as (poly)alkylene glycol monoalkyl ethers and (poly)alkylene glycol monoaryl ethers, glycol esters such as (poly)alkylene glycol acetates, glycol ether esters such as (poly)alkylene glycol monoalkyl ether acetate; hydrocarbons such as aliphatic hydrocarbons and aromatic hydrocarbons; esters; ethers such as tetrahydrofuran and diethylether; and amides such as dimethylformamide (DMF), dimethylacetamide (DMAC), and N-methyl-2-pyrrolidone (NMP). Two or more solvents may be used in combination.

Silver Colloidal Particle

The silver particle mentioned above may be dispersed in an aqueous dispersion medium as silver colloid having protective colloid attached to the surface thereof. Due to this, dispersion property of the silver particle to the aqueous dispersion medium is particularly excellent, thereby significantly improving storage stability of ink.

The silver colloid can be prepared by any method. For example, it can be obtained by preparing a solution containing silver ion and reducing this silver ion with a reducing agent under the presence of a protective colloid as described in, for example, JP-2006-299329-A1. When manufacturing a metal colloid by these methods, addition of a surfactant, etc., to an aqueous solution at any moment before and after the reduction reaction further improves dispersion stability of metal particles.

The mean number diameter of the silver particle can be controlled by controlling the reduction reaction. That is, it is possible to control the addition speed of the reducing agent and the reaction temperature. For example, particles having smaller particle diameters can be obtained by slowing down the addition speed of the reducing agent and lowering the liquid temperature.

The protective colloid can be any organic article serving to protect the surface of the silver particle with no specific limit. For example, organic compounds having a carboxyl group or dispersant polymers are preferable. These can be used alone or in combination, and the combinational use is more preferable to demonstrate synergy effect.

Organic Compound Having Carboxyl Group

The number of carboxyl groups in the organic compound having a carboxyl group has no particular limit as long as it is at least one per molecule, and can be suitably selected to suit to a particular application. For example, it is preferably from 1 to 10, more preferably from 1 to 5, and particularly preferably from 1 to 3.

In the organic compound having a carboxylic group, carboxylic group may entirely or partially form salts (salts with amine, metal salts, etc.). In particular, in the present disclosure, it is possible to suitably use organic compounds in which carboxyl groups (in particular, all carboxyl groups) do not form salts (in particular, salts with basic compounds such as salts with amine or amine salts), i.e., organic compounds having isolated carboxyl groups.

In addition, as the organic compound having a carboxyl group, it has no particular limit as long as it includes carboxyl group, and can be suitably selected to suit to a particular application. Also, inclusion of functional groups (or coordinating group to metal compound or metal nano particle) other than carboxyl group is allowed.

Specific examples of such functional groups (or coordinating group) other than carboxyl group include, but are not limited to, groups (or functional groups) containing at least one hetero atoms selected from the group consisting of halogen atoms (fluorine atom, chlorine atom, bromine atom, iodine atom, etc.), nitrogen atom, oxygen atom, and sulfur atom, for example, groups having nitrogen atoms such as amino group, substituted amino group (e.g., dialkyl amino group), imino group (—NH—), nitrogen-containing cyclic groups such as 5 to 8 membered nitrogen-containing heterocyclic groups such as pyridyl group, carbazol group, morphonyl group), amide group (—CON<), cyano group, and nitro group, groups containing oxygen atoms such as hydroxy group, alkoxy group (such as alkoxy groups having 1 to 6 carbon groups such as methoxy group, ethoxy group, propoxy group, and buthoxy group), formyl groups, carbonyl groups (—CO—), ester group (—COO—), and oxygen-containing cyclic groups (such as 5 to 8 membered oxygen-containing cyclic groups such as tetahydropyranyl group), groups containing sulfur atoms such as thio group, thiol group, thiocarbonyl group (—SO—), alkylthio group (such as alkylthio groups having one to four carbon atoms such as methylthio group and ethylthio group), sulfo group, sulfamoyl group, and sulfinyl group (—SO$_2$—), and groups forming these salts such as ammonium salt group). These groups can be contained alone or in combination in the organic compounds containing carboxylic group.

As the organic compound containing carboxyl group, of these functional groups, compounds containing no basic group (in particular, amino group, substituted amino group, imino group, ammomium salt group, etc.) that can form a salt with carboxyl group are preferable.

A representative organic compound containing a carboxyl group is a carboxyl acid. Examples include, but are not limited to, monocarboxylic acids, polycarboxylic acids, and hydroxy carboxylic acids (or oxycarboxylic acids).

Specific examples of the monocarboxylic acid include, but are not limited to, aliphatic monocarboxylic acids (saturated aliphatic monocarboxylic acids such as those having 1 to 34 carbon atoms, preferably 1 to 30 carbon atoms such as acetic acid, propionic acid, butylic acid, caprylic acid, caproic acid, hexanoic acid, capric acid, lauric acid, myristic acid, cyclohexane carboxylic acid, dehydrocholic acid, and cholanic acid), unsaturated aliphatic monocarboxylic acid (such as those having 4 to 34 carbon atoms, preferably 10 to 30 carbon atoms, such as oleic acid, erucic acid, linolic acid, and abietic acid), and aromatic monocarboxylic acids (such as those having 7 to 12 carbon atoms such as benzoic acid and naphthoic acid).

Specific examples of the polycarboxlic acid include, but are not limited to, aliphatic polycarboxylic acids (saturated aliphatic polycarboxylic acids such as those having 2 to 14 carbon atoms, preferably 2 to 10 carbon atoms such as oxalic acid, malonic acid, succinic acid, glutaric acid, adipic acid, azelaic acid, sebacic acid, and cyclohexane dicarboxylic acid), unsaturated aliphatic polycarboxylic acid (such as those having 4 to 14 carbon atoms, preferably 4 to 10 carbon atoms, such as maleic acid, fumaric acid, itaconic acid, sorbic acid, and tetrahydrophthalic acid), and aromatic polycarboxylic acids (such as those having 8 to 12 carbon atoms such as phthalic acid and trimellitic acid).

Specific examples of the hydroxycarboxylic acid include, but are not limited to, hydroxymonocarboxylic acid (such as aliphatic hydroxymonocarboxylic acid such as those having 2 to 50 carbon atoms, preferably 2 to 34 carbon atoms, and more preferably 2 to 30 carbon atoms such as glycolic acid, lactic acid, oxybutylic acid, glyceric acid, 6-hydroxy-hexanoic acid, cholic acid, deoxycholic acid, chenodeoxycholic acid, 12-oxochenodeoxycholic acid, glycocholic acid, lithocholic acid, hyodeoxycholic acid, ursodeoxycholic acid, apocholic acid, and taurocholic acid, aromatic hydroxy monocarboxylic acid (such as those having 7 to 12 carbon atoms such as salicylic acid, oxybenzoic acid, and gallic acid, and hydroxypolycarboxylic acids (such as those having 2 to 10 carbon atoms, such as aliphatic hydroxypolycarboxylic acids such as tartronic acid, tartaric acid, citric acid, and malic acid).

Those carboxylic acids are allowed to form salts and may be anhydrides or hydrates. In many cases, as described above, carboxylic acid does not form a salt (in particular, salts with basic compounds such as salts with amines).

These organic compounds having carboxylic acid can be used alone or in combination. As the organic compound having carboxyl group, hydroxy carboxylic acids are preferable such as aliphatic hydroxy carboxylic acids (aliphatic hydroxymonocarboxylic acids and aliphatic hydroxypolycarboxylic acids).

As the aliphatic hydroxy carboxyl group, alicyclic hydroxy carboxylic acids or hydroxycarboxylic acid having an alicyclic backbone are preferable. As the alicyclic hydroxy carboxylic acid or hydroxycarboxylic acid having an alicyclic backbone, alicyclic hydroxy carboxylic acids having 6 to 34 carbon atoms such as cholic acid are preferable. Alicyclic hydroxy carboxylic acids having 10 to 34 carbon atoms are preferable, and alicyclic hydroxy carboxylic acids having 16 to 30 carbon atoms are particularly preferable.

Polycyclic aliphatic hydroxy carboxylic acid such as cholic acid (such as condensation polycyclic aliphatic hydroxy carboxylic acid, preferably condensation polycyclic aliphatic hydroxy carboxylic acid having 10 to 34 carbon atoms, more preferably condensation polycyclic aliphatic hydroxy carboxylic acid having 14 to 34 carbon atoms, and particularly preferably condensation polycyclic aliphatic hydroxy carboxylic acid having 18 to 30 carbon atoms), polycyclic aliphatic carboxylic acids (for example, condensation polycyclic aliphatic carboxylic acids, preferably, condensation polycyclic aliphatic carboxylic acid having 10 to 34 carbon atoms, more preferably condensation polycyclic aliphatic carboxylic acid having 14 to 34 carbon atoms, particularly preferably condensation polycyclic aliphatic carboxylic acid having 18 to 30 carbon atoms, such as dehydrocholic acid and cholic acid (such as condensation polycyclic aliphatic carboxylic acid having 10 to 50 carbon atoms, preferably condensation polycyclic aliphatic carboxylic acid having 12 to 40 carbon atoms, more preferably condensation polycyclic aliphatic carboxylic acid having 14 to 34 carbon atoms, and particularly preferably condensation polycyclic aliphatic carboxylic acid having 18 to 30 carbon atoms. These have bulky structure so that agglomeration of silver particles can be significantly reduced, which is preferable.

The number average molecular weight of the organic compound having a carboxyl group is, for example, 1,000 or less (for example, about 46 to about 900), preferably 800 or less (for example, about 50 to about 700), and more preferably 600 or less (for example, about 100 to about 500).

The pKa value of the organic compound having a carboxyl group is, for example, 1 or greater (for example, about 1 to about 10) and preferably 2 or greater (for example, about 2 to about 8). The number average molecular weight can be measured by, for example, gel permeation chromatography (GPC).

Dispersant Polymer

In the present disclosure, the protective colloid is preferably constituted of a combination of the organic compound having a carboxyl group and the dispersant polymer. Such a constitution of protective colloid assists in obtaining a silver colloid containing silver particles in an extremely small amount of coarse particles. In particular, in the present disclosure, due to this particular combination of the protective colloid, the proportion of the silver particle can be increased in spite of a small proportion of coarse particles and storage stability of the silver colloid (and liquid dispersion thereof) is excellent.

The dispersant polymer has no particular limit as long as it can cover the silver particle. Preferably, amphiphatic dispersant polymers (or oligomer type dispersants) are preferably used.

Examples are those used to disperse a colorant in paint and ink.

Specific examples include, but are not limited to, styrene-based resin (styerene-(meth)acrylic acid copolymer, styrene-maleic anhydride copolymer, etc.), acrylic resins (methyl (meth)acrylate-(meth)acrylic acid copolymer, etc.), water-soluble urethane resins, water-soluble acrylic urethane resins, water-soluble epoxy resins, water-soluble polyester-based resins, cellulose derivatives (nitrocellurose, alkylcellulose such as ethylcellulose, alkyl-hydroxyalkyl cellulose such as ethylhydroxyethyl cellulose, hydroxyalkylcellulose such as hydroxyethyl cellulose and hydroxy propyl cellulose, cellulose ethers of carboxyalkyl cellulose such as carboxymethyl cellulose), polyvinyl alcohol, polyalkylene glycol (liquid polyethylene glycol, polypropylene glycol, etc.), natural polymers (gelatin, dextrin, etc.), polyethylene sulfonate, and formalin condensation products of naphthalene sulfonic acid. These can be used alone or in combination.

Representative dispersant polymers (amphiphatic dispersant polymer) are resins, water-soluble resins, or water-dispersible resins, including hydrophilic units (or hydrophilic block) constituted of hydrophilic monomers).

Specific examples of the hydrophilic monomer include, but are not limited to, monomers for addition polymerization such as monomers containing carboxyl group or acid anhydride {for example, (meth)acrylic monomers such as acrylic acid and methacrylic acid, unsaturated polycarboxuylic acids such as maleic acid, and maleic anhydride) and monomers containing hydroxyl group (hydroxyalkyl(meth)acrylate such as 2-hydroxyethyl(meth)acrylate, and vinylphenol); and monomers for condensation polymerization such as alkylene oxide (such as ethylene oxide).

The monomer for condensation polymerization may form a hydrophilic unit through reaction with an active group (for example, hydroxyl group-containing monomers) such as hydroxyl group). The hydrophilic monomer may form a hydrophilic unit alone or in combination.

At least, the dispersant polymer includes a hydrophilic unit (or hydrophilic block). It can be a mono polymer or copolymer of a hydrophilic monomer (for example, polyacrylic acid or a salt thereof). Also, like the styrene-based resins or acrylic resins specified above, it can be a copolymer of a hydrophilic monomer and a hydrophobic monomer.

Specific examples of the hydrophobic monomer (nonionic monomer) include, but are not limited to, (meth)acrylic monomers such as (meth)acrylate {(meth)acrylic acid of alkyl having 1 to 20 carbon atoms such as methyl(meth) acrylate, ethyl(meth)acrylate, n-butyl(meth)acrylate, 2-ethylhexyl(meth)acrylate, lauryl(meth)acrylate, and stearyl (meth)acrylate, (meth)acrylic acid cycloalkyl such as cyclohexyl(meth)acrylate, aryl(meth)acrylate such as phenyl(meth)acrylate, benzyl(meth)acrylate, and aralkyl(meth) acrylate such as 2-phenyl ethyl(meth)acrylate}, styrene-based monomers such as styrene, α-methylstyrene, and vinyltoluene, olefin-based monomers such as α-olefin having 2 to 20 carbon atoms (such as ethylene, propylene, 1-butene, isobotylene, 1-hexene, 1-octen, and 1-dodecene), carboxylic acid vinylester-based monomers such as vinyl acetate and vinyl butylate. The hydrophobic monomer may form a hydrophobic unit alone or in combination.

When the dispersant polymer is a copolymer, for example, a copolymer of a hydrophilic monomer and a hydrophobic monomer, the copolymer is allowed to be a random copolymer, an alternate copolymer, a block copolymer (for example, a copolymer of a hydrophilic block constituted of a hydrophilic monomer and a hydrophobic block constituted of a hydrophobic monomer), or a comb copolymer (or comb graft copolymer).

The structure of the block copolymer is not particularly limited. For example, diblock structure and a triblock structure (ABA type and BAB type) are allowed.

In addition, in the comb-like copolymer, the main chain may be constituted of the hydrophilic block or the hydrophobic block or the hydrophilic block and the hydrophobic block.

In addition, the hydrophilic unit may be constituted of, for example, condensation-based block such as hydrophilic block (polyethyleneoxide, polyalkylene oxide such as polyethyleneoxide-polypropylene oxide) constituted of alkyleneoxide (ethylene oxide, etc.).

The hydrophilic block (polyalkylene oxide, etc.) and the hydrophobic block (polyolefin block, etc.) are allowed to be bonded via a coupling group such as ester bond, amide bond, ether bond, urethane bond, etc.

To form the bond, for example, hydrophobic block (such as polyolefin) is modified by a modifier (such as unsaturated carboxylic acid or anhydride thereof such as maleic anhydride, lactam or aminocarboxylic acid, hydroxyl amine, and diamine) and thereafter the hydrophilic block is introduced.

In addition, the comb copolymer (comb copolymer having the main chain constituted of a hydrophobic block) is allowed to be formed through reaction (or bond) between a polymer obtained from a monomer (such as the hydroxylalkyl(meth)acrylate) having a hydrophilic group such as hydroxyl group and carboxyl group and the condensation-based hydrophilic monomer (such as ethylene oxide group).

Moreover, in the copolymerization component, the hydrophobicity and the hydrophilicity can be balanced by using a hydrophilic nonionic monomer.

For example, such a component includes a monomer or oligomer including an alkyleneoxy (in particular ethyleneoxy) unit such as 2-(2-methoxyethoxy)ethyl(meth)acrylate and polyethylene glycol monomethacrylate (having, for example, a number average molecular weight of from 200 to 1,000).

In addition, hydrophilicity and hydrophobicity can be balanced by modification (for example, esterification) of a hydrophilic group (such as carboxyl group).

The dispersant polymer may include a functional group.

Examples of the functional group include acid groups (or acidic such as carboxyl group or acid anhydride group), sulfo group (sulfonic acid group), and hydroxy group. The dispersant polymer may contain these functional groups alone or in combination. Of these functional groups, it is preferable to include an acid group and more preferable to include carboxyl group.

In addition, when the dispersant polymer includes an acid group (such as carboxyl group), the acid group (such as carboxyl group) may at least partially or entirely form a salt (salt with amine, metal salt, etc.). In particular, in the present disclosure, it is possible to suitably use a dispersant polymer (that is, including an isolated acid group, in particular, carboxyl group) in which an acid group such as carboxyl group (in particular all carboxyl groups) does not form a salt [(in particular, a salt (salt with an amine or amine salt) with a basic compound].

The acid value of the dispersant polymer having an acid group (in particular, carboxyl group) is, for example, preferably 1 mgKOH/g or greater (for example, 2 mgKOH/g to 100 mgKOH/g), more preferably 3 mgKOH/g or greater (for example, 4 mgKOH/g to 90 mgKOH/g), furthermore preferably 5 mgKOH/g or greater (for example, 6 mgKOH/g to 80 mgKOH/g), and particularly preferably 7 mgKOH/g or greater (for example, 8 mgKOH/g to 70 mgKOH/g). In addition, normally, it can be 3 mgKOH/g to 50 mgKOH/g (for example, 5 mgKOH/g to 30 mgKOH/g). Note that, in the dispersant polymer having an acid group, the amine value is allowed to be zero (or almost zero).

In the dispersant polymer, the site of the functional group mentioned above is not particularly limited. It can be at the main chain or the side chain and both of the main chain and the side chain.

Such functional groups can be, for example, functional groups (for example, hydroxyl group) derived from a hydrophilic monomer or a hydrophilic unit. They can be introduced into a polymer through copolymerization of a copolymerizable monomer (such as maleic anhydride) having a functional group. These can be used alone or in combination. Polymer dispersants disclosed in Japanese Unexamined Patent Application Publication No. 2004-207558 can be used as the dispersant polymers.

It is possible to use suitably synthesized article or products available on the market as the dispersant polymer.

Specific examples of the dispersant polymer (or dispersant constituted of at least amphiphatic dispersant) available on the market include, but are not limited to, Solsperse series (manufactured by AvECIA GROUP) such as Solsperse 13240, Solsperse 13940, Solsperse 32550, Solsperse 31845, Solsperse 24000, Solsperse 26000, Solsperse 27000, Solsperse 28000, and Solsperse 41090; DISPERBYK series (manufactured by BYK-Chemie GmbH) such as DISPERBYK 160, DISPERBYK 161, DISPERBYK 162, DISPERBYK 163, DISPERBYK 164, DISPERBYK 166, DISPERBYK 170, DISPERBYK 180, DISPERBYK 182, DISPERBYK 184, DISPERBYK 190, DISPERBYK 191, DISPERBYK 192, DISPERBYK 193, DISPERBYK 194, DISPERBYK 2001, and DISPERBYK 2050; EFKA-46, EFKA-47, EFKA-48, EFKA-49, EFKA-1501, EFKA-1502, EFKA-4540, EFKA-4550, Polymer 100, Polymer 120, Polymer 150, Polymer 400, Polymer 401, Polymer 402, Polymer 403, Polymer 450, Polymer 451, Polymer 452, and Polymer 453 (available from EFKA Chemical Co., Ltd.); AJISPER series (manufactured by Ajinomoto Fine-Techno Co., Inc.) such as AJISPER PB711, AJISPER PA111, AJISPER PB811, AJISPER PB821, and AJISPER PW911, FLOWLEN series (manufactured by KYOETSHA CHEMICAL Co., LTD.) such as FLOWLEN DOPA-158, FLOWLEN DOPA-22, FLOWLEN DOPA-17, FLOWLEN TG-700, FLOWLEN TG-720W, FLOWLEN 730W, FLOWLEN 740W, and FLOWLEN-745W; and JONCRYL® series (manufactured by Johnson Polymer) JONCRYL® 678, JONCRYL® 679, and JONCRYL® 62.

Of these, specific examples of the dispersant polymer having an acid group include, but are not limited to, DISPERBYK 190 and DISPERBYK 194.

The number average molecular weight of the dispersant polymer is preferably from 1,500 to 100,000, more preferably from 2,000 to 80,000 (for example, 2,000 to 60,000), furthermore preferably from 3,000 to 50,000 (for example, 5,000 to 30,000), and particularly preferably from 7,000 to 20,000. The number average molecular weight can be measured by, for example, gel permeation chromatography (GPC).

Pigment Particle Diameter

The recording liquid of the present disclosure contains a luster pigment having a mean number diameter of less than 200 nm.

Due to such a pigment having a small particle diameter, the surface of a printed layer of printed matter can be made very smooth, thereby imparting a high level of luster.

The mean number diameter can be measured by using a particle size analyzer (Nanotrac Wave-UT151, manufactured by MicrotracBEL Corp.). The recording medium may be diluted for measuring the mean number diameter.

Pigment Concentration

The concentration of the luster pigment in the recording liquid is preferably from 1 to 10 percent by mass and more preferably from 2 to 7 percent by mass. When the concentration is 1 percent by mass or greater, sufficient luster and image clarity can be obtained. When it is 10 percent by mass or less, the discharging stability of ink ameliorates, thereby striking a balance between abrasion resistance and luster. To secure luster, it is suitable to reduce the amount of a resin in comparison with the pigment. For this reason, if the pigment concentration is set excessively high to secure luster, the pigment is not sufficiently fixed on a recording medium with the resin, thereby failing to secure abrasion resistance. Such a concentration that the coverage ratio of a recording medium by the pigment is about 100 percent, meaning the pigment is in directly contact with the recording medium, is suitable and approximately from 2 to 7 percent although depending on the type of the pigment material, the pigment particle diameter, the form of the pigment, the ratio of the thickness to the area (in the case of tabular pigment), and the type of recording medium. The coverage ratio increases as the pigment concentration increases, so that the luster increases. However, the luster and the image clarity stop increasing even if the pigment concentration is increased after the pigment concentration reaches to a degree that the coverage ratio of the recording medium by the pigment is around 100 percent. Depending on the recording medium, the smoothness may be impaired and the luster and the image clarity may be lowered.

Shear Thinning Agent

The recording liquid of the present disclosure contains a modified ethylene vinyl acetate polymer or a combination of a polyamide amine salt and an aliphatic acid amide as a shear thinning agent. By adding the shear thinning agent, the hue (a*, b*) becomes close to silver.

Polyamide amine salts and aliphatic acid amides are preferably not used separately but mixed.

When used in combination with a tabular metal pigment, the pigment is aligned and smoothly arranged on the recording medium, so that luster and image clarity are enhanced.

Further, the following compounds may be used in combination with the modified ethylene vinyl acetate polymer or the combination of the polyamide amine salt and the aliphatic acid amide as the shear thinning agent.

For oil ink using an organic solvent as solvent, examples include, but are not limited to, a cross-linkable acrylic resin, an emulsion type of a cross-linkable acrylic resin, a non-cross-linkable acrylic resin, a cross-linkable N-vinyl carboxylic acid amide polymer or copolymer, waxes such as a non-cross-linkable N-vinyl carboxylic acid amide polymer or copolymer, hydrogenated castor oil, aliphatic acid amide wax, and oxidized polyethylene wax, aliphatic acid metal salts such as aluminum salts of stearic acid, palmitic acid, octylic acid, and lauric acid, dibenzylidene sorbitol, N-acyl amino acid compounds, smectite-based inorganic compounds, montmorillonite-based inorganic compounds, bentonite-based inorganic compounds, hectorite-based inorganic compounds, and silica. For aqueous ink using water as a solvent, examples include, but are not limited to, polyamide, Xanthan gum, welan gum, succinoglycan whose constituent monosaccharide is an organic acid-modified heteropolysaccharide of glucose and galactose (average molecular weight of about 1 to 8 million), guar gum, locust bean gum and derivatives thereof, polymers having a molecular weight of from 100,000 to 150,000 containing an alkyl ester of methacrylic acid as a main component, a thickening polysaccharide having gelling ability extracted from seaweeds such as, glucomannan, agar and carrageenan, benzylidene sorbitol, benzylidene xylitol, or derivatives thereof, cross-linkable acrylic acid polymers, inorganic fine particles, polyglycerin aliphatic acid esters, polyoxyethylene sorbitan aliphatic acid esters, polyethylene glycol aliphatic acid esters, polyoxyethylene castor oil, polyoxyethylene lanolin•lanolin alcohol•beeswax derivative, polyoxyethylene alkyl ether•polyoxypropylene alkyl ether, polyoxyethylene alkyl phenyl ether, nonionic surfactants having an HLB value of from 8 to 12 such as aliphatic acid amide, dialkyl or dialkenyl sulfosuccinic acid salts a mixture of N-alkyl-2-pyrrolidone and an anionic surfactant, and a mixture of polyvinyl alcohol and an acrylic resin. The above-mentioned shear thinning agent can be used in combination, and the polymer can be used as the resin in the present disclosure.

In addition to the above-mentioned improvement effect, inclusion of the modified ethylene vinyl acetate polymer or the combination of the polyamide amine salt and the aliphatic acid amide in a suitable range (in the range of from 0.2 to 6 parts by mass to 100 parts by mass of the pigment) makes the hue of the printed layer (a*, b*) close to (0,0). The range of a* value and b* value can be adjusted in the range of from about −5.0 to about 2.0 and about −10.0 to about 3.0, respectively, so that the hue of the recording liquid becomes silver.

Although, in the present disclosure, a luster pigment having a mean number diameter of less than 200 nm is used, such a typical pigment causes waviness with a cycle of less than 200 nm on a printed layer, thereby optically exhibiting a structural color. Due to this waviness cycle, silver is not exhibited but gold, copper, and bronze. The cycle of waviness changes depending on the types of recording media and different color hues are exhibited depending on printing on gloss paper, vinyl chloride, and polyethylene terephthalate (PET).

Although the mechanism is not clear, the present inventors have inferred that since such effects are exhibited by using a modified ethylene vinyl acetate polymer as a shear thinning agent having both a hydrophilic portion and a lipophilic portion or a combinational use of a polyamide amide salt as a shear thinning agent having a hydrophilic portion and an aliphatic acid amide as a shear thinning agent having a lipophilic portion, an organic solvent having a particularly high-boiling point and a hydrophilic pigment are allowed to be blended via the shear thinning agent in the recording liquid of the present disclosure, which leads to good leveling property on the surface layer of the printed layer in the final stage of drying in which the solvent having a high boiling point evaporates. According to the observation of the printed layer of printed matter using the recording liquid of the present disclosure, it is found that it has particularly highly smooth and the pigment is more uniformly dispersed. The waviness of the surface layer of the printed layer is reduced as compared with the case where a shear thinning agent is not included.

Viscosity of Recording Liquid

The viscosity of the recording liquid to which the shear thinning agent is added is 40 mPa·s or less and preferably from 1 to 40 mPa·s by an E-type viscometer at 20 degrees C. in order to obtain discharging stability in an inkjet recording method.

It is desirable to appropriately balance the water, the organic solvent, the amount of the resin, and the surfactant contained in the recording liquid to obtain viscosity in the above-specified range. As the amount of the solvent is smaller, the hue tends to be closer to silver, which is preferable.

Hereinafter, organic solvents, resins, and additives that may be contained in the recording liquid of the present disclosure will be described.

Resin Particle

The resin particle preferably has a mean number diameter of from 10 to 50 nm and more preferably from 10 to 30 nm. When the mean number diameter is from 10 to 30 nm, it is possible to optimally strike a balance between metallic luster (glossiness) and abrasion resistance of coated film. When the particle size is 10 nm or more, the abrasion resistance is improved, and when it is 50 nm or less, the discharging stability is improved.

The particle diameter can be measured by using a particle size analyzer (Nanotrac Wave-UT151, manufactured by MicrotracBEL Corp).

The resin particle has no particular limit and can be suitably selected to suit to a particular application. Specific examples include, but are not limited to, polyurethane resin particles, polyester resin particles, acrylic resin particles, styrene resin particles, butadiene resin particles, styrene-butadiene resin particles, acrylic styrene resin particles, and acrylic silicone resin particles. These can be used alone or in combination. Of these, polyurethane resin particles are preferable in terms of enhancing abrasion resistance of printed matter.

Examples of the polyurethane resin particle include, but are not limited to, polycarbonate urethane resin particles, polyester urethane resin particles, and polyether urethane resin particles. Of these, polyester urethane resin particles are preferable.

This is because the polyester urethane resin particles have a relatively small impact on the luster of printed image even when the proportion of the polyester urethane resin particle increases.

The polyurethane resin particles are preferably polyurethane resin particles synthesized using a polyol.

The polyol is not particularly limited and can be suitably selected to suit to a particular application. An example is polyester polyol.

The resin particle enhances dispersibility of the particles in the recording liquid, hardness of the recording liquid coated film, and abrasion resistance. The proportion of the resin particle in the recording liquid is preferably not more than 5 percent by mass and more preferably not more than 2 percent by mass to the total amount of the recording liquid. If the proportion is not more than 5.0 percent by mass, the storage stability, discharging stability, and exhibition of luster of the recording liquid can be enhanced. The image clarity is inhibited as the proportion increases.

When the resin particle is dispersed in an aqueous medium, it is possible to use a forcible emulsification type using a dispersant. However, since such a dispersant tends to remain in a layer (film), thereby weakening the strength of the coated film, a so-called self-emulsification type resin particle, which has an anionic group in its molecule structure, is preferably used.

The acid value of the anionic group of the resin particle of the self-emulsification type is preferably from 5 to 100 mgKOH/g and more preferably from 5 to 50 mgKOH/g in terms of water dispersibility, abrasion resistance, and chemical resistance.

Specific examples of the anionic group include, but are not limited to, carboxyl group, carboxylate group, sulfonic acid group, and sulfonate group. Of these, a carboxylate group or a sulfonate group which is partially or entirely neutralized by a basic compound, etc. is preferable to maintain good water dispersion stability. To introduce an anionic group into a resin, it is suitable to use a monomer having such an anionic group.

To manufacture a water dispersion of resin particles having the anionic group, for example, a basic compound usable to neutralize the anionic group is added to a water dispersion.

Specific examples of the basic compound include, but are not limited to, organic amines such as ammonium, triethyl amine, pyridine, and morpholine, alkanol amine such as monoethanol amine, and metal salt compounds containing Na. K. Li, Ca, etc. These can be used alone or in combination.

To prepare a water dispersion using the resin particle of the forced emulsification type, for example, a surfactant such as a nonionic surfactant and an anionic surfactant can be used. These can be used alone or in combination. Of these, nonionic surfactants are preferable in terms of water resistance.

Specific examples of the nonion surfactants include, but are not limited to, polyoxyethylene alkyl ether, polyoxyethylene alkylene alkyl ether, polyoxyethylene derivatives, polyoxyethylene aliphatic acid esters, polyoxyethylene polyol aliphatic acid ester, polyoxyethylene propylene polyol, sorbitan aliphatic acid ester, polyoxyethylene curable ricinus, polyoxyalkylene polycyclic phenyl ether, polyoxyethylene alkyl amine, alkyl alkanol amide, and polyalkylene glycol (meth)acrylate. These can be used alone or in combination. Of these, polyoxyethylene alkylether, polyoxyethylene aliphatic acid esters, polyoxyethylene sorbitan aliphatic acid ester, and polyoxyethylene alkylamine are preferable.

Specific examples of the anionic surfactants include, but are not limited to, alkyl sulfuric acid ester salts, polyoxyethylene alkyl ether sulfuric acid salts, alkyl benzene sulfonic acid salts, α-olefine sulfonic acid salts, methyl lauryl acid salts, sulfosuccinic acid salts, ether sulfonic acid salts, ether carboxylic acid salts, aliphatic acid salts, naphthalene sulfonic acid formalin condensed compounds, alkyl amine salts, quaternary ammonium salts, alkyl betaine, and alkyl amine oxide. These can be used alone or in combination. Of these, polyoxyethylene alkylether sulfuric acid salts and sulfosuccinic salts are preferable.

The proportion of the surfactant to the entire resin particle is preferably from 0.1 to 30 percent by mass and more preferably from 5 to 20 percent by mass. When the proportion is within the range of from 0.1 to 30 percent by mass, resin film is suitably formed and recording liquid having excellent attachability and water resistance can be obtained so that recorded matter is free of blocking.

Urethane Resin

The recording liquid of the present disclosure may contain urethane resin particles.

When the recording liquid contains urethane resin particles, luster and fixability can be imparted to the coated film.

Urethane resin particles are preferably added as a resin emulsion having the particles dispersed in water as a continuous phase at the time of manufacturing a recording liquid.

In the present disclosure, the recording liquid may contain one or more urethane resins and the urethane resin can be used without any particular limitation with respect to the urethane resin obtained by reacting a polyol with a polyisocyanate.

The usable polyols are, for example, polyether polyols, polycarbonate polyols, and polyester polyols.

A polycarbonate-based urethane resin using a polycarbonate polyol as the polyol is particularly preferable to obtain an excellent image fastness.

Specific examples of the polyisocyanate for use in preparing the urethane resin include, but are not limited to, aromatic diisocyanates such as phenylene diisocyanate, tolylene diisocyanate, diphenylmethane diisocyanate, and naphthalene diisocyanate and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. These can be used alone or in combination.

The recording liquid of the present disclosure is expected to be applied to posters, signboards, etc., for outdoor use, so that an applied layer is demanded to have an extremely high level of weather resistance for a long period of time. In terms of this, using aliphatic or alicyclic diisocyanates is preferable.

Method of Manufacturing Polyurethane Resin Particle

The polyurethane resin particle can be manufactured by typical manufacturing methods. For example, the following method is suitable.

First, a urethane prepolymer having an isocyanate group at its distal end is prepared under the presence of no solvent or an organic solvent through the reaction of the polyol and the polyisocyanate with an equivalent ratio in which isocyanate groups are excessive.

Next, optionally the anionic group in the urethane prepolymer having an isocyanate group at its distal end is neutralized by a neutralizer. Thereafter, subsequent to reaction with a chain elongating agent, the organic solvent in the system is removed if necessary to obtain the urethane resin particle.

As the polyurethane resin particle, polycarbonate-based polyurethane resin particle is preferable in terms of water resistance, heat resistance, abrasion resistance, weathering resistance, and abrasion resistance of images due to high agglomeration power of carbonate groups. The recording liquid obtained by using polycarbonate-based polyurethane resin is suitable for printed matter for use in severe conditions like outdoor use.

As the polyurethane resin particle, commercially available products may be used.

Specific examples include, but are not limited to, UCOAT UX-485 (polycarbonate-based polyurethane resin particles), UCOAT UWS-145 (polyester-based polyurethane resin particles), PERMARIN UA-368T (polycarbonate-based polyurethane resin particles), and PERMARIN UA-200 (polyether-based polyurethane resin particles) (all manufactured by Sanyo Chemical Industries, Ltd.), ELASTRON H-38 (polyether-based water-soluble urethane resin, manufactured by DKS Co., Ltd.), ELASTRON E-37 (polyester-based water-soluble urethane resin, manufactured by DKS Co., Ltd.), SUPERFLEX® 420NS, SUPERFLEX® 460S, and SUPERFLEX® 470 (all manufactured by polycarbonate-based urethane resin liquid dispersion, manufactured by DKS Co., Ltd.), Superflex 150HS (ester-ether-based urethane resin liquid dispersion, manufactured by DKS Co., Ltd.), and SUPERFLEX 500M (ester-based urethane resin liquid dispersion, manufactured by DKS Co., Ltd.). These can be used alone or in combination.

Water-Soluble Resin

The luster recording liquid of the present disclosure can contain a water-soluble resin. Polyvinyl alcohol (PVA), polyvinyl pyrrolidone, polyethylene oxide, polyacrylamide, carboxymethyl cellulose (CMC), etc., are widely used.

It is also possible to contain a cross-linkable monomer such as carbodiimide, aziridine, and isocyanate. It is possible to form a tougher printed layer by cross-linking the resin contained together.

Specific examples of the aqueous cross-linking agent having a hydrophilic segment added to a polycarbodiimide resin include, but are not limited to, Carbodiimides V-10 and V-12G (both manufactured by Nisshinbo Chemical Corp.).

When the resin is soluble in a vehicle, the gap is easily filled with the pigment particle. When a resin soluble in a vehicle is contained, it contributes less to the fixability of the coated film of the recording liquid than fine resin particles. However, it serves as a dispersant for dispersing the pigment and thus easily secures dispersion stability of the pigment.

Of the recording liquid, aqueous recording liquid is relatively safe, so that it is popular in the market. Accordingly, a water-soluble urethane resin is particularly preferable as the water-soluble resin.

As the water-soluble polymer, a water-soluble polymer having an ionic hydrophilic group, such as an alkali metal salt, an ammonium salt, an inorganic acid salt or an organic acid salt of a sulfonic acid group, a carboxylic acid group or an amino group, may be used. Such water-soluble polymers may be used alone or in combination of two or more of them.

Specific examples include, but are not limited to, a carboxymethyl cellulose salt, a cellulose derivative such as viscose, natural polymers such as an alginate, gelatin, albumin, casein, gum arabic, gum tragacanth and lignin sulfonate, starch derivatives such as cationic starch, phosphate starch and a carboxymethyl starch salt, and synthetic polymers such as a polyacrylate salt, a polyvinyl sulfate salt, a poly(4-vinylpyridine) salt, a polyamide, a polyarylamine salt, a naphthalene sulfonate condensate salt, a styrene-acrylate salt copolymer, a styrene-methacrylate salt copolymer, an acrylate ester-acrylate salt copolymer, an acrylate ester-methacrylate salt copolymer, a methacrylate ester-acrylate salt copolymer, a methacrylate ester-methacrylate salt copolymer, a styrene-itaconate salt copolymer, an itaconate ester-itaconate salt copolymer, a vinylnaphthalene-methacrylate salt copolymer, and a vinylnaphthalene-itaconate salt copolymer. Of these, an ammonium salt of a styrene-acrylate copolymer can suitably be used.

The water-soluble polymer preferably has a weight average molecular weight of from 2,000 to 1,000,000. If the weight average molecular weight is 2,000 or more, the abrasion resistance of an image can be improved. If the weight average molecular weight is 1,000,000 or less, it is easy to set viscosity of the recording liquid within a dischargeable range in an inkjet method.

The proportion of the water-soluble polymer to the total amount of the recording liquid is preferably from 0.01 to 5 percent by mass. If the proportion is 0.01 percent by mass or more, abrasion resistance of an image can be enhanced. Unless the proportion is not greater than 5 percent by mass, the requisites of the present disclosure are not satisfied, so that the concealment property is insufficient.

The water-soluble polymer is also available on the market. Specific examples include, but are not limited to, JONCRYL® 61J (molecular weight, 10,000; acid value, 195), JONCRYL® 68 (molecular weight, 10,000; acid value, 195), JONCRYL® 450 (molecular weight, 10,000 to 20,000; acid value, 100), JONCRYL® 55 (molecular weight, 7,500; acid value, 200), JONCRYL® 555 (molecular weight, 5,000; acid value, 200), JONCRYL® 586 (molecular weight, 3,100; acid value, 105), JONCRYL® 680 (molecular weight, 3,900; acid value, 215), JONCRYL® 682 (molecular weight, 1,600, acid value 235) and JONCRYL® 683 (molecular weight, 7,300; acid value, 150), all manufactured by Johnson Polymer Corp.; B-36 (molecular weight, 6,800; acid value, 250); as well as TEGO Dispers 651, TEGO Dispers 656, TEGO Dispers 670, TEGO Dispers 685, TEGO Dispers 688, TEGO Dispers 750W, TEGO Dispers 755W, and TEGO Dispers 757W (manufactured by Evonik). In this context, the molecular weight refers to the weight average molecular weight.

To strike a balance between fixability to an impermeable medium such as a transparent PET film and dispersion stability of the luster pigment in a recording liquid, it is desirable to contain a solvent-soluble resin and a water-dispersible resin in the recording liquid at the same time.

Surfactant

As for the recording liquid of the present disclosure, a surfactant can be added so as to secure the wettability to a recording medium.

The addition amount of a surfactant to the recording liquid is preferably from 0.1 to 5 percent by mass. When the addition amount is 0.1 percent by mass or more, the wettability of a recording liquid to a non-porous substrate is secured, thereby improving the image quality. When the addition amount is 5 percent by mass or less, the recording liquid tends not to foam so that excellent discharging stability is achieved.

As the surfactant to be used, any of an amphoteric surfactant, a nonionic surfactant, an anionic surfactant, a fluorochemical surfactant, etc. can be used in combination. Considering the relation between the dispersion stability of a coloring material and the image quality, nonionic surfactants are preferable and examples include, but are not limited to, polyoxyethylene alkyl phenyl ether, polyoxyethylene alkyl ester, polyoxyethylene alkyl amine, polyoxyethylene alkyl amide, polyoxyethylene propylene block polymer, sorbitan aliphatic esters, polyoxyethylene sorbitan aliphatic acid esters, and adducts of acetylene alcohol with ethylene oxides. Depending on the formulation, it is also possible to use a silicone-based surfactant alone.

The recording liquid of the present disclosure preferably contains a silicone-based surfactant. In the luster recording liquid, the proportion of the pigment is high. It has a large number of coarse particles due to poor dispersion stability as compared with a typical inkjet color pigment. For this reason, the discharging stability is somewhat difficult, the discharging bending frequently occurs and the discharging speed tends to vary. In order to uniformly fill a solid image with such a recording liquid, it is necessary to improve the discharging stability, increase the wettability of the recording liquid, and increase the dot diameter. The recording liquid containing a silicone-based surfactant, particularly a recording liquid containing a polyether-based silicone surfactant, has excellent discharging stability and wettability.

Silicone-Based Surfactant

As the silicone-based surfactants, for example, the following is preferable: a compound (silicone-based compound) such as polydimethylsiloxane having a polysiloxane backbone including a hydrophilic group in the side chain or a hydrophilic polymer chain and a compound (silicone-based compound) such as polydimethylsiloxane having a polysiloxane backbone including a hydrophilic group at terminal or a hydrophilic polymer chain. The silicone-based surfactant means a compound having a polysiloxane backbone in its structure.

Examples of the hydrophilic group and the hydrophilic polymer chain are polyether groups (polyethyleneoxide, polypropylene oxide, and copolymers thereof), polyglycerin $(C_3H_6(CH_2CH(OH)CH_2O)_n$—H, etc.), pyrrolidone, betaine $(C_3H_6N^+(C_2H_4)_2$—$CH_2COO^-$, etc.), sulfates $(C_3H_6O(C_2H_4O)_n$—$SO_3Na$, etc.), phosphates $(C_3H_6O(C_2H_4O)_n$—P(=O)OHONa, etc.), and quaternary salts $(C_3H_6N^+(C_2H_4)_3Cl^-$, etc.). In the chemical formulae, n represents an integer of 1 and above. Of these, compounds having a polyether group are preferable.

In addition, a vinyl-based copolymer is also preferable which has a silicone-based compound chain such as polydimethylsiloxane in its side chain. This is obtained by copolymerization of a polydimethylsiloxane having a polymerizable vinyl group at terminal with another copolymerizable monomer (it is preferable to at least partially use a hydrophilic monomer such as a (meth)acrylic acid or its salt in the monomer mentioned above).

Of these, a compound having a polysiloxane backbone and a hydrophilic polymer chain is preferable. More preferred are compounds having a polyether group as the hydrophilic polymer chain. In addition, a non-ionic surfactant is particularly preferable in which a silicone-based surfactant has methyl polysiloxane as a hydrophobic group and a polyoxyethylene backbone as a hydrophilic group.

Examples of the silicone-based surfactant are polyether-modified silicone and silicone compounds having a polyoxyalkylene group.

The silicone-based surfactant is available on the market. Specific example include, but are not limited to, Silface SAG005 (HLB value: 7.0) and Silface SAG008 (HLB value: 7.0), both are manufactured by Nisshin Chemical Co., Ltd., FZ2110 (HLB value: 1.0, FZ2166 (HLB value: 5.8), SH-3772M (HLB value: 6.0), L7001 (HLB value: 7.4), SH-3773M (HLB value: 8.0), all of which are manufactured by Dow Corning Toray Co., Ltd.), KF-945 (HLB value: 4.0), and KF-6017 (HLB value: 4.5), both of which are manufactured by Shin-Etsu Chemical Co., Ltd., and FormBan MS-575 (HLB value: 5.0), manufactured by Ultra Additives Inc.).

The proportion of the surfactant to the entire recording liquid is preferably from 0.1 to 4.0 percent by mass and more preferably from 0.2 to 2.0 percent by mass. When the proportion is from 0.1 to 4.0 percent by mass, fixability of the recording liquid onto various non-permeable recording media can be improved and image quality such as gloss can be improved.

The silicone surfactant is not particularly limited as long as it is used for ink and paint. It is preferable to use a surfactant represented by the following Chemical formula 1 or 2 to obtain good discharging stability and print quality. In particular, the surfactant having the structure represented by the Chemical formula 1 has high wettability, which makes it possible to print with larger dots. In addition, it is possible to obtain better discharging stability if a surfactant represented by the following Chemical formula 3 is used in combination.

Hereinafter, the silicone surfactants represented by Chemical formulae 1 to 3 will be described.

Chemical formula 1

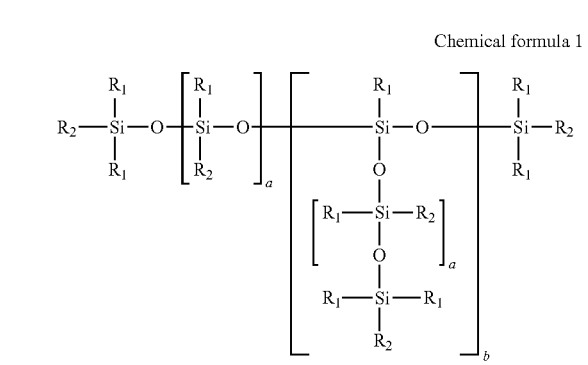

In Chemical formula 1, a represents an integer of from 1 to 500 and b represents 0 or an integer of from 1 to 10. $R_1$ represents an alkyl group or an aryl group. $R_2$ represents any one of the following A, B, C, and D and at least one of $R_2$ includes A.

(A)

Chemical formula A

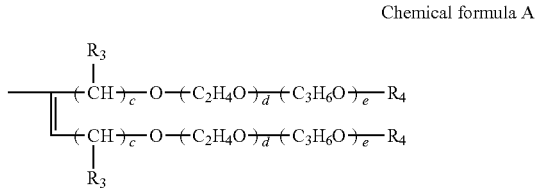

In Chemical formula A, c represents an integer of from 1 to 20, d represents 0 or an integer of from 1 to 50, and e is 0 or an integer of from 1 to 50. $R_3$ represents a hydrogen atom or an alkyl group and $R_4$ represents a hydrogen atom, an alkyl group, or an acylic group.

(B)

Chemical formula B

In Chemical formula B, f represents an integer of from 2 to 20. $R_5$ is a hydrogen atom, an alkyl group, an acyl group, and an ether group having a dimethylpropyl backbone.

(C)

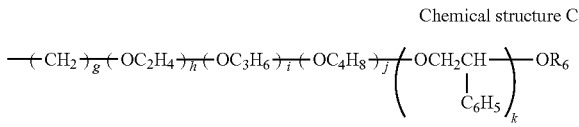

Chemical structure C

In Chemical formula C, g represents an integer of from 2 to 6, h represents 0 or an integer of from 1 to 20, i represents an integer of from 1 to 50, j represents 0 or an integer of from 1 to 10, and k represents 0 or an integer of from 1 to 10. $R_6$ is a hydrogen atom, an alkyl group, or an acyl group. D: an alkyl group or an aryl group.

Specific examples of the product available on the market of the compound represented by the Chemical formula 1 include, but are not limited to, Tegotwin 4000 and Tegotwin 4100, manufactured by Evonik Industries AG.

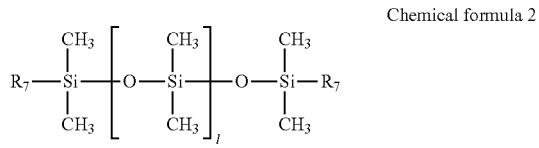

Chemical formula 2

In Chemical formula 2, 1 represents an integer of from 10 to 80. $R_7$ represents a substitution group represented by Chemical formula E.

(E)

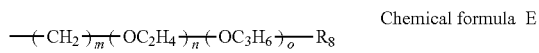

Chemical formula E

In Chemical formula E, m represents an integer of from 1 to 6, n represents 0 or an integer of from 1 to 50, o represents 0 or an integer of from 1 to 50, and n+o is an integer of 1 or greater. $R_8$ represents a hydrogen atom or an alkyl group having 1 to 6 carbon atoms, or a (meth)acrylic group.

Specific examples of the product available on the market of the compound represented by Chemical formula 2 include, but are not limited to, BY16-201 and SF8427 (manufactured by Dow Corning Toray Co., Ltd.), BYK-331, BYK-333, and BYK-UV3500 (manufactured by BYK-Chemie GmbH), and Tegoglide 410, Tegoglide 432, Tegoglide 435, Tegoglide 440, and Tegoglide 450 (all manufactured by Evonik Industries AG).

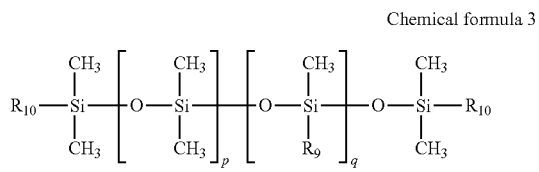

Chemical formula 3

In Chemical formula 3, p and q each, independently represent integers of 1 or greater and p+q are an integer of from 3 to 50. $R_9$ represents a substitution group represented by the following Chemical formula F and $R_{10}$ represents an alkyl group having 1 to 6 carbon atoms.

(F)

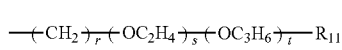

Chemical formula F

In Chemical formula F, r represents an integer of from 1 to 6, s represents 0 or an integer of from 1 to 50, t represents 0 or an integer of from 1 to 50, and s+t is an integer of 1 or greater. $R_{11}$ represents a hydrogen atom or an alkyl group having 1 to 6 carbon atoms, or a (meth)acrylic group.

Specific examples of the product available on the market of the compound represented by the Chemical formula 3 include, but are not limited to, SF8428, FZ-2162, 8032 ADDITIVE, SH3749, FZ-77, L7001, L-7002, FZ-2104, FZ-2110, FZ-2123, SH8400, and SH3773M (all manufactured by Dow Corning Toray Co., Ltd.), BYK-345, BYK-346, BYK-347, BYK-348, and BYK-349 (all manufactured by BYK-Chemie GmbH), Tegowet 250, Tegowet 260, Tegowet 270, and Tegowet 280 (all manufactured by Evonik Industries AG), and KF-351A, KF-352A, KF-353, KF-354L, KF-355A, KF-615A, KF-640, KF-642, and KF-643 (all manufactured by Shin-Etsu Chemical Co., Ltd.).

Organic Solvent

The content ratio (proportion) of the organic solvent is preferably from 10 to 60 percent by mass and more preferably from 20 to 60 percent by mass to the total content of the recording liquid in light of drying property and discharging reliability of the recording liquid.

Further, as the organic solvent for use in the present disclosure, the following water-soluble organic solvents can be used in combination. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 2-methyl-1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1, 2,4-butane triol, 1,2,3-butanetriol, 2,2,4-trimethyl-1,3-pentanediol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrol actone; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

An organic solvent having a boiling point of 250 degrees C. or higher may be used for the recording liquid of the present disclosure. Such an organic solvent is used to ensure wettability while containing a highly concentrated solid content. This also impair drying property, so that it is desirable to use the solvent in a small amount as possible. Preferably, it is 0 to less than 1 percent.

Specific examples include, but are not limited to, glycerin, diethylene glycol dibutyl ether, triethylene glycol dimethyl ether, tetraethylene glycol dimethyl ether, polyethylene glycol dimethyl ether, and polyethylene glycol monomethyl ether.

Other Optional Components

As the other components, examples are preservatives and fungicides, corrosion inhibitors, pH regulators, transparent anti-aging agents for rubber and plastic such as hindered phenol and hindered phenol amine, and an adjusting agent.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to be not lower than 7. Specific examples include, but are not limited to, amines such as diethanol amine and triethanol amine.

Anti-Oxidant

Antioxidants are oxidized as substitutes for components in a product, thereby preventing the product itself from being oxidized. Corrosion due to oxidation of the metal member, metal pigment, etc. in the flow path can be prevented.

Specific examples include, but are not limited to, triazoles such as benzotriazole, vitamin C, sodium sulfite. potassium sulfite, etc.

Water

Water is a major medium of an aqueous recording liquid. As water, pure water and hyperpure water such as deionized water, ultrafiltered water, reverse osmosis water, and distilled water are preferable to remove ionic impurities as much as possible. In addition, it is preferable to use water sterilized through ultraviolet irradiation or addition of hydrogen peroxide to prevent incidence of mold or bacteria for an extended period of time of storage of the recording liquid. The proportion of water in the recording liquid has no particular limit and can be suitably selected to suit to a particular application. In terms of diminishing burden on environment and inclusion of other optional components, the proportion is preferably from 10 to 90 percent by mass and more preferably from 20 to 60 percent by mass.

Recording Device and Recording Method

The recording liquid of the present disclosure can be suitably applied as ink to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device).

In the present disclosure, the recording device and the recording method respectively represent a device capable of discharging ink, various processing fluids, etc. to a recording medium and a method of conducting recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as a recording medium.

Figure 2:
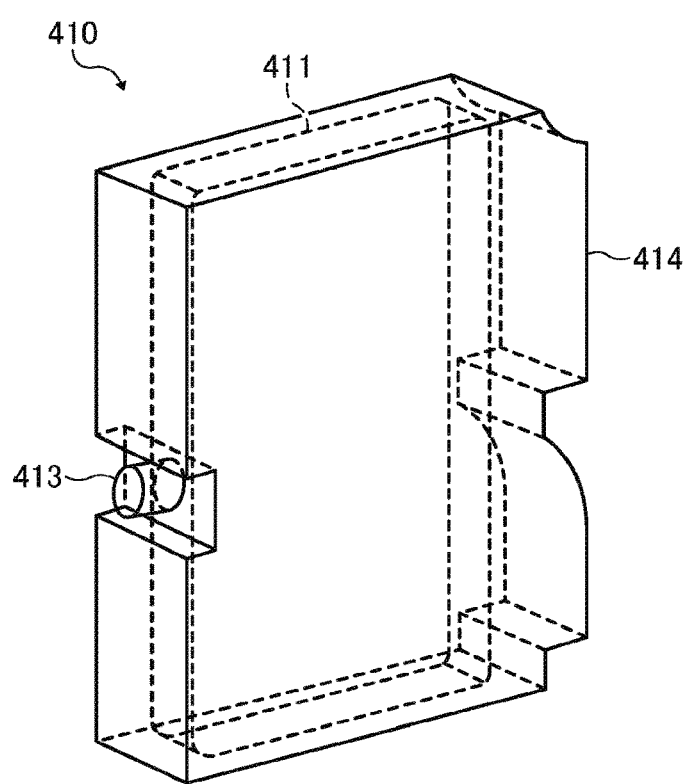
FIG. 2 is a diagram illustrating a perspective view of an example of a main tank.

The recording device is described using an example with reference to FIG. 1 and FIG. 2. FIG. 1 is a diagram illustrating a perspective view of the recording device. FIG. 2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410s, 410c, 410m, and 410y) for each color of silver (K), cyan (C), magenta (M), and yellow (Y) is made of, for example, packaging material such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

The ink of the silver (S) ink is the recording liquid of the present disclosure. In addition, the color inks of cyan (C), magenta (M), and yellow (Y) are not particularly limited, and known inks can be appropriately selected to suit to a particular application. Further, in addition to the three colors other than silver (S), inks such as black (K) and white (W) may be additionally used. When using the additional ink, a liquid storage unit having the additional ink and a liquid discharging head are added to the recording device. By applying an ink containing a coloring material other than silver to the position on the recording medium to which the silver ink of the present disclosure has been applied, it is possible to reproduce colors having various metallic lusters other than silver.

This recording device may include not only a portion to discharge ink but also a device referred to as a pre-processing device, a post-processing device, etc.

As an example of the pre-processing device and the post-processing device, like the ink of silver (S), cyan (C), magenta (M), and yellow (Y) ink, the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device not employing the inkjet printing method but a blade coating method, a roll coating method, or a spray coating method.

The substrate for printing in the inkjet recording method of the present disclosure is mostly a non-porous substrate. This non-porous substrate is a resin film, laminated paper, coated paper, etc. having a surface formed of non-porous materials such as transparent or colored polyvinyl chloride film, polyethylene terephthalate (PET) film, acrylic film, polypropylene film, polyimide film, and polystyrene film. Also, it includes an article having a surface free of paper components such as wood pulp paper, Japanese paper, synthesized pulp paper, and synthesized fiber paper.

The inkjet recording method of the present disclosure can be applied to various recording by an inkjet recording system, for example, printers, facsimile machines, photocopiers, and printers/photocopiers/multifunction peripherals for inkjet recording in particular.

Image forming, recording, printing, print, etc., in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto.

Preparation of Silver Particle Liquid Dispersion 1

66.8 g of silver nitrate, 7.2 g of a polymer dispersant having a carboxyl group (Disperbyk 190 (BYK-190), solvent: water, 40 percent by mass nonvolatile component, acid value of 10 mg KOH/g, amine value of 0 mg KOH/g, manufactured by BYK-Chemie GmbH), and 1.8 g of cholic acid (manufactured by Wako Pure Chemical Industries, Ltd.) were added to 50 g of deionized water followed by vigorous stirring to obtain a suspension. To this suspension, 50 g of dimethylaminoethanol (manufactured by Wako Pure Chemical Industries, Ltd.) was gradually added such that the water temperature did not surpass 50 degrees C. followed by heating and stirring for two and a half hours in a water bath at a water temperature of 60 degrees C. The thus-obtained reaction liquid was filtrated by a glass filter (GC-90, average diameter: 0.8 μm, manufactured by ADVANTEC CO., LTD.) to obtain a silver particle liquid dispersion 1 containing silver in an amount of 40 percent by mass and water in an amount of 18.9 percent by mass. The particle size distribution of the silver particle in the thus-obtained silver particle liquid dispersion 1 was measured by a particle size analyzer (Nanotrac Wave-EX150, manufactured by NIKKISO CO., LTD.). The mean number diameter was 20 nm.

Preparation of Tabular Silver Particle Liquid Dispersion 2

In 1 L of distilled water, 50 g of silver nitrate was dissolved to obtain a first solution. A total amount of 22.2 g of oxalic acid was dissolved in 1 L of distilled water to obtain a second solution. The first solution and the second solution were mixed to obtain a liquid mixture containing silver oxalate. Impurities were removed from the liquid mixture. A total amount of 3 g of polyethylene glycol (dispersant) was added to 1 litter of the liquid mixture followed by stirring for 30 minutes while applying ultrasonic wave. Therefore, silver oxalate was dispersed. This liquid mixture was charged into an autoclave. This liquid mixture was pressurized at a pressure of 0.5 MPa. While this liquid mixture was stirred at a rate of rotation of 800 rpm, it was heated to 150 degrees C. The liquid mixture was stirred for 30 minutes at this temperature to obtain a liquid containing fine particles mainly containing silver. The average of the arithmetic mean roughness Ra of the fine particle was 2.0 nm.

The liquid containing the fine particles chiefly composed of silver was centrifuged to remove excess polyethylene glycol. The resulting precipitate was further added to ethylene glycol monoethyl ether acetate (ECA) and stirred. The precipitate was taken out and excessive ethylene glycol monoethyl ether acetate was removed by a centrifugal separator. The precipitate was thermally dried for a predetermined time to obtain a fine silver particle-containing composition (silver particle liquid dispersion 2). This composition contained 90 percent by mass silver particles and 10 percent by mass other substances (mainly ethylene glycol monoethyl ether acetate).

The silver particle was in a tabular form. The size distribution of the silver particle in the thus-obtained silver particle liquid dispersion 2 was measured in the same manner as in the silver particle liquid dispersion 1. The mean number diameter of the silver particle was 310 nm, R was 400 nm, the average thickness d was 50 nm, and R/d=8.0.

Preparation of Tabular Silver Particle Liquid Dispersion 3

A silver particle liquid dispersion 3 containing fine particles was obtained in the same manner as in Preparation of Tabular Silver Particle Liquid Dispersion 2 except that the rate of stirring during reaction was changed to 1,000 rpm. The size distribution of the silver particle in the thus-obtained silver particle liquid dispersion 3 was measured in the same manner as in the silver particle liquid dispersion 1. The mean number diameter of the silver particle was 150 nm, R was 220 nm, the average thickness d was 50 nm, and R/d=4.4.

Preparation of Tabular Silver Particle Liquid Dispersion 4

A silver particle liquid dispersion 4 containing fine particles was obtained in the same manner as in Preparation of Tabular Silver Particle Liquid Dispersion 2 except that the rate of stirring during reaction was changed to 1,600 rpm and the reaction temperature was changed to 180 degrees C. The size distribution of the silver particle in the thus-obtained silver particle liquid dispersion 4 was measured in the same manner as in the silver particle liquid dispersion 1.

The mean number diameter of the silver particle was 130 nm, R was 180 nm, the average thickness d was 20 nm, and R/d=9.0.

Example 1

Preparation of Silver Ink 1

12.5 percent by mass silver particle liquid dispersion 1, 0.25 percent by mass BYK-190 as a dispersant, 22.0 percent by mass 1,2-propanediol (manufactured by Tokyo Chemical Industry Co., Ltd.), 22.0 percent by mass 3-methoxy-3-methylbutanol (manufactured by Tokyo Chemical Industry Co., Ltd.), 3.3 percent by mass 2-ethyl-1,3-hexanediol, 0.1 percent by mass benzotriazole as an antioxidant, 0.94 percent by mass polycarbonate-based urethane resin liquid dispersion (SUPERFLEX® 420NS, 32 percent by mass non-volatile content, manufactured by DKS Co., Ltd.), 0.075 percent by mass AQUATIX 8420 (20 percent by mass non-volatile content, manufactured by BYK-Chemie GmbH) as a shear thinning agent, 1.0 percent by mass BYK-345 (manufactured by BYK-Chemie GmbH) as a surfactant, and a balance of deionized water to make the total amount 100 percent by mass were mixed and stirred followed by filtration through a polypropylene filter (syringe filter, manufactured by Sartorius) having an average pore size of 0.2 μm to obtain silver ink 1 (Mt1).

The mean number diameter of the silver particles in the obtained silver ink 1 was 310 nm, which was the same as the mean number diameter of the silver particle in the silver liquid dispersion 1.

Examples 2 to 31 and Comparative Examples 1 to 4

Preparation of Silver Inks 2 to 36

Silver inks 2 to 36 were obtained in the same manner as in the preparation of silver ink 1 except that the formulation was changed to those shown in Tables 1-1 to 1-4. The formulations were shown in Tables 1-1 to 1-4. The values in Tables 1-1 to 1-4 are represented in percent by mass.

The mean number diameter of the silver particles in the obtained silver inks 2 to 36 was the same as the mean number diameter of the silver particle in the silver liquid dispersion used.

The details of each component shown in Tables 1-1 to 1-4 are as follows.
Resin
Water-Soluble Urethane Resin
ELASTRON H-38 (polyether-based water-soluble urethane resin, manufactured by DKS Co., Ltd.)
ELASTRON E-37 (polyester-based water-soluble urethane resin, manufactured by DKS Co., Ltd.)
Urethane Resin Particle
SUPERFLEX® 420NS (Polycarbonate-based urethane resin liquid dispersion, mean number diameter 10 nm, manufactured by DKS Co., Ltd.)
SUPERFLEX® 460S (Polycarbonate-based urethane resin liquid dispersion, mean number diameter 30 nm, manufactured by DKS Co., Ltd.)
SUPERFLEX® 470 (Polycarbonate-based urethane resin liquid dispersion, mean number diameter 50 nm, manufactured by DKS Co., Ltd.)
SUPERFLEX® 150HS (Ester-ether-based urethane resin liquid dispersion, mean number diameter 80 nm, manufactured by DKS Co., Ltd.)
SUPERFLEX® 500M (Ester-based urethane resin liquid dispersion, mean number diameter 140 nm, manufactured by DKS Co., Ltd.)
Dispersant
BYK-190 (Carboxyl group-containing polymer dispersant, manufactured by BYK-Chemie GmbH)
Surfactant
BYK-345 (silicone-based surfactant, manufactured by BYK-Chemie GmbH)
FS-34 (fluorochemical surfactant, manufactured by Chemours)
Shear Thinning Agent
AQUATIX 8420 (Nonionic emulsion of modified ethylene vinyl acetate copolymer wax (EVA), manufactured by BYK-Chemie GmbH)
AQH-800 (Polyamide amine salt/aliphatic acid amide, manufactured by Kusumoto Chemicals, Ltd.)
AQ-633E (Polyamide, manufactured by Kusumoto Chemicals, Ltd.)
Device First, using an inkjet printer (remodeled based on IPSiO GXe5500, manufactured by Ricoh Co., Ltd.), a solid image (100 percent duty) was output on gloss paper (photo paper silk grain type, MPGSA420 gloss paper for inkjet, manufactured by Mitsubishi Chemical Corporation) with the metallic ink liquid in a gloss paper mode of 1200 dpi×1200 dpi at a platen temperature of 40 degrees C. and a fan heater temperature of 50 degrees C. Immediately after the output, it was put into an oven heated to 85 degrees C. for two minutes, dried and taken out. Ra of the gloss paper was 11 nm.

Evaluation Items
Evaluation of Degree of Luster

The 20° gloss of recorded matter after drying was measured by a gloss meter (Micro-TRI-gloss, manufactured by BYK Gardner Corp.).

The value of 20° gloss is preferably 350 or more. More preferably, it is 600 or greater. At 350 or greater, image clarity appears. If it is 600 or greater, it can be said that the luster is close to silver foil.

Evaluation Criteria
S: 600 or greater
A: 500 to less than 600
B: 350 to less than 500
C: Less than 350
Hue ($a^*$, $b^*$)

Each evaluation sample was lined with ten pieces of white plain paper (My Paper 6200, Y-type, manufactured by RICOH Co., Ltd.) and the color hue of a formed solid portion was measured. The hue was measured 10 times with X-Rite 938 (manufactured by X-Rite Inc.) and determined by the average value thereof.

Preferably, the region enclosed by $a^*$ of from −5.0 to +2.0 and $b^*$ of from −10.0 to +3.0 and more preferably in the region of the ellipse inscribed in the boundary. True white (0,0) is ideal. However, the hue to be aimed at is tolerant of the slightly cool hue in keeping with the human sense of silver.

Taking saturation ($\sqrt{a^{*2}+b^{*2}}$) for the boundary, the saturation tolerable is up to about $\sqrt{125}$ on the blue side and up to about $\sqrt{13}$ on the gold side. It is preferably B or higher.

Evaluation Criteria
S: (0, 0) or b<0, saturation≤$\sqrt{13}$
A: b<0, $\sqrt{13}$<saturation<$\sqrt{45}$, or b>0, saturation<$\sqrt{13}$
B: b<0, $\sqrt{45}$≤saturation≤$\sqrt{125}$ or b>0, $\sqrt{3}$≤saturation≤$\sqrt{13}$
C: b<0, saturation>$\sqrt{125}$, or b>0, saturation>$\sqrt{13}$ Discharging Stability Nozzle Omission An inkjet printer (IPSiO Gxe5500, manufactured by Ricoh Co., Ltd.) was filled with the obtained metallic inks 1 to 36 and the nozzle check pattern was printed on gloss paper for inkjet (photo paper silk type MPGSA420, gloss paper for inkjet ink, silk type, manufactured by Mitsubishi Chemical Corporation) with the inkjet printer. Thereafter, the number of discharging nozzles of all the 384 nozzles from which the ink was discharged was checked and "nozzle omission" was evaluated based on the following evaluation criteria. Note that B and higher are practically acceptable and A is preferable.

Evaluation Criteria

A: Number of discharging nozzles was 384
B: Number of discharging nozzles was from 336 to less than 384
C: Number of discharging nozzles was less than 336

Evaluation on Abrasion Resistance

The dried recorded matter was set on a color fastness rubbing tester AB-301 (manufactured by TESTER SANGYO CO., LTD.) and abraded 10 times with a friction element (load: 300 g) on which white cotton (according to JIS L 0803) was attached at the contact portion, the degree of deterioration was visually observed, and abrasion resistance was evaluated according to the following criteria.

A: Number of abrasion was less than 5, no foundation observed
B: Number of abrasion was from 5 to less than 10, no foundation observed
C: Number of abrasion was 10 or more, foundation (printed matter) partially exposed
D: Number of abrasion was 10 or more, most of substrate (printed matter) exposed

TABLE 1-1

| | | Silver ink No. | Example 1 Mt1 | Example 2 Mt2 | Comparative Example 1 Mt3 | Comparative Example 2 Mt4 |
|---|---|---|---|---|---|---|
| | Pigment liquid dispersion | Silver particle (40 percent) BYK-190 (2 percent) liquid dispersion 1 (D50 20 nm) | 12.5 | 12.5 | | 12.5 |
| | | Tabular silver particle (90 percent) BYK-190 (2 percent) liquid dispersion 2 (D50 310 nm d: 50 nm) | | | 5.6 | |
| | | Tabular silver particle (90 percent) BYK-190 (2 percent) liquid dispersion 3 (MEAN NUMBER DIAMETER 180 nm d: 50 nm) | | | | |
| | | Tabular silver particle (90 percent) BYK-190 (2 percent) liquid dispersion 4 (MEAN NUMBER DIAMETER 130 nm d: 20 nm) | | | | |
| | | Concentration (percent) of pigment to total amount of ink | 5 | 5 | 5 | 5 |
| Resin | Dispersant | BYK-190 | 0.25 | 0.25 | 0.25 | 0.25 |
| | Water-soluble urethane resin | ELASTRON H-38 | | | | |
| | | ELASTRON E-37 | | | | |
| | Catalyst | ELASTRON CAT-21 | | | | |
| Resin | Urethane resin emulsion | SUPERFLEX® 420NS solid portion 10 nm | 0.30 | 0.3 | 0.3 | 0.3 |
| | | SUPERFLEX® 460S solid portion 30 nm | | | | |
| | | SUPERFLEX® 470 solid portion 50 nm | | | | |
| | | SUPERFLEX® 150HS solid portion 80 nm | | | | |
| | | SUPERFLEX® 500M solid portion 140 nm | | | | |
| Organic solvent | Humectant | 1,2-Propanediol | 22.0 | 22.0 | 22.0 | 22.0 |
| | Penetrant (low boiling point) | 3-Methoxy-3-methylbutanol | 22.0 | 22.0 | 22.0 | 22.0 |
| | Penetrant (high boiling point) | 2-Ethyl-1,3-hexanediol | 3.3 | 3.3 | 3.3 | 3.3 |
| Surfactant | Silicone-based surfactant | BYK-345 | 1.0 | 1.0 | 1.0 | 1.0 |
| | Fluorochemical surfactant | FS-34 | | | | |
| Preservative | Anti-oxidant | Benzotriazole | 0.1 | 0.1 | 0.1 | 0.1 |
| Shear thinning agent | Modified ethylene vinyl acetate polymer | AQUATIX8420 solid | 0.0150 | | 0.0150 | |
| | Polyamide amine salt/ aliphatic acid amide | AQH-800 solid | | 0.0250 | | |
| | Polyamide | AQ-633E Solid | | | | 0.0150 |
| Water | | Deionized water | Balance | Balance | Balance | Balance |
| | | Total | 100.0 | 100.0 | 100.0 | 100.0 |
| | Properties | Viscosity (mPa·s) | 7 | 7 | 7 | 7 |
| | | R (nm) | 20 | 20 | 400 | 20 |
| | | d (nm) | 20 | 20 | 50 | 20 |
| | | R/d | 1 | 1 | 8 | 1 |

TABLE 1-1-continued

| | | | | | | |
|---|---|---|---|---|---|---|
| | Evaluation | 20° gloss | S | S | C | S |
| | | Hue evaluation | S | S | S | C |
| | | Discharging stability | A | A | A | A |
| | | Abrasion resistance | A | A | A | A |

| | | Silver ink No. | Comparative Example 3 Mt5 | Comparative Example 4 Mt6 | Comparative Example 5 Mt7 |
|---|---|---|---|---|---|
| Pigment liquid dispersion | | Silver particle (40 percent) BYK-190 (2 percent) liquid dispersion 1 (MEAN NUMBER DIAMETER 20 nm) | 12.5 | | |
| | | Tabular silver particle (90 percent) BYK-190 (2 percent) liquid dispersion 2 (Mean number diameter 310 nm d: 50 nm) | | | |
| | | Tabular silver particle (90 percent) BYK-190 (2 percent) liquid dispersion 3 (Mean number diameter 180 nm d: 50 nm) | | 22.2 | 22.2 |
| | | Tabular silver particle (90 percent) BYK-190 (2 percent) liquid dispersion 4 (Mean number diameter 130 nm d: 20 nm) | | | |
| | | Concentration (percent) of pigment to total amount of ink | 5 | 20 | 20 |
| Resin | Dispersant | BYK-190 | 0.25 | 1.00 | 1.00 |
| | Water-soluble urethane resin | ELASTRON H-38 | | | |
| | | ELASTRON E-37 | | | |
| | Catalyst | ELASTRON CAT-21 | | | |
| Resin | Urethane resin emulsion | SUPERFLEX ® 420NS solid portion 10 nm | 0.3 | 0.3 | 0.3 |
| | | SUPERFLEX ® 460S solid portion 30 nm | | | |
| | | SUPERFLEX ® 470 solid portion 50 nm | | | |
| | | SUPERFLEX ® 150HS solid portion 80 nm | | | |
| | | SUPERFLEX ® 500M solid portion 140 nm | | | |
| Organic solvent | Humectant | 1,2-Propanediol | 22.0 | 40.0 | 65.0 |
| | Penetrant (low boiling point) | 3-Methoxy-3-methylbutanol | 22.0 | 4.0 | 4.0 |
| | Penetrant (high boiling point) | 2-Ethyl-1,3-hexanediol | 3.3 | 3.3 | 3.3 |
| Surfactant | Silicone-based surfactant | BYK-345 | 1.0 | 1.0 | 1.0 |
| | Fluorochemical surfactant | FS-34 | | | |
| Preservative | Anti-oxidant | Benzotriazole | 0.1 | 0.1 | 0.1 |
| Shear thinning agent | Modified ethylene vinyl acetate polymer | AQUATIX8420 solid | | 0.0600 | 0.0600 |
| | Polyamide amine salt/ aliphatic acid amide | AQH-800 solid | | | |
| | Polyamide | AQ-633E Solid | | | |
| Water | | Deionized water | Balance | Balance | Balance |
| | | Total | 100.0 | 100.0 | 100.0 |
| | Properties | Viscosity (mPa · s) | 7 | 42 | 100 |
| | | R (nm) | 20 | 230 | 230 |
| | | d (nm) | 20 | 50 | 50 |
| | | R/d | 1 | 4.6 | 4.6 |
| | Evaluation | 20° gloss | S | B | C |
| | | Hue evaluation | C | C | C |
| | | Discharging stability | A | C | C |
| | | Abrasion resistance | A | D | D |

| | | Silver ink No. | Example 3 Mt8 | Example 4 Mt9 | Example 5 Mt10 |
|---|---|---|---|---|---|
| Pigment liquid dispersion | | Silver particle (40 percent) BYK-190 (2 percent) liquid dispersion 1 (Mean number diameter 20 nm) | 1.25 | 2.5 | 7.5 |
| | | Tabular silver particle (90 percent) BYK-190 (2 percent) liquid dispersion 2 (Mean number diameter 310 nm d50 nm) | | | |

TABLE 1-1-continued

|  |  |  | | | |
|---|---|---|---|---|---|
|  |  | Tabular silver particle (90 percent) BYK-190 (2 percent) liquid dispersion 3 (Mean number diameter 180 nm d: 50 nm) | | | |
|  |  | Tabular silver particle (90 percent) BYK-190 (2 percent) liquid dispersion 4 (Mean number diameter 130 nm d: 20 nm) | | | |
|  |  | Concentration (percent) of pigment to total amount of ink | 0.5 | 1 | 3 |
| Resin | Dispersant | BYK-190 | 0.25 | 0.25 | 0.25 |
|  | Water-soluble urethane resin | ELASTRON H-38 | | | |
|  |  | ELASTRON E-37 | | | |
|  | Catalyst | ELASTRON CAT-21 | | | |
| Resin | Urethane resin emulsion | SUPERFLEX ® 420NS solid portion 10 nm | 0.03 | 0.06 | 0.18 |
|  |  | SUPERFLEX ® 460S solid portion 30 nm | | | |
|  |  | SUPERFLEX ® 470 solid portion 50 nm | | | |
|  |  | SUPERFLEX ® 150HS solid portion 80 nm | | | |
|  |  | SUPERFLEX ® 500M solid portion 140 nm | | | |
| Organic solvent | Humectant | 1,2-Propanediol | 22.0 | 22.0 | 22.0 |
|  | Penetrant (low boiling point) | 3-Methoxy-3-methylbutanol | 22.0 | 22.0 | 22.0 |
|  | Penetrant (high boiling point) | 2-Ethyl-1,3-hexanediol | 3.3 | 3.3 | 3.3 |
| Surfactant | Silicone-based surfactant | BYK-345 | 1.0 | 1.0 | 1.0 |
|  | Fluorochemical surfactant | FS-34 | | | |
| Preservative | Anti-oxidant | Benzotriazole | 0.1 | 0.1 | 0.1 |
| Shear thinning agent | Modified ethylene vinyl acetate polymer | AQUATIX8420 solid | 0.0015 | 0.0030 | 0.0090 |
|  | Polyamide amine salt/ aliphatic acid amide | AQH-800 solid | | | |
|  | Polyamide | AQ-633E Solid | | | |
| Water |  | Deionized water | Balance | Balance | Balance |
|  |  | Total | 100.0 | 100.0 | 100.0 |
|  | Properties | Viscosity (mPa · s) | 7 | 7 | 7 |
|  |  | R (nm) | 20 | 20 | 20 |
|  |  | d (nm) | 20 | 20 | 20 |
|  |  | R/d | 1 | 1 | 1 |
|  | Evaluation | 20° gloss | B | B | S |
|  |  | Hue evaluation | B | S | S |
|  |  | Discharging stability | A | A | A |
|  |  | Abrasion resistance | A | A | A |

TABLE 1-2

|  |  | Silver ink No. | Example 6 Mt11 | Example 7 Mt12 | Example 8 Mt13 | Example 9 Mt14 |
|---|---|---|---|---|---|---|
| Pigment liquid dispersion |  | Silver particle (40 percent) BYK-190 (2 percent) liquid dispersion 1 (Mean number diameter 20 nm) | 17.5 | 25 | 32.5 | 12.5 |
|  |  | Tabular silver particle (90 percent) BYK-190 (2 percent) liquid dispersion 2 (Mean number diameter 310 nm d: 50 nm) | | | | |
|  |  | Tabular silver particle (90 percent) BYK-190 (2 percent) liquid dispersion 3 (Mean number diameter 180 nm d: 50 nm) | | | | |
|  |  | Tabular silver particle (90 percent) BYK-190 (2 percent) liquid dispersion 4 (Mean number diameter 130 nm d: 20 nm) | | | | |
|  |  | Concentration (percent) of pigment to total amount of ink | 7 | 10 | 13 | 5 |

TABLE 1-2-continued

| Resin | Dispersant | BYK-190 | 0.25 | 0.25 | 0.25 | 0.25 |
|---|---|---|---|---|---|---|
| | Water-soluble urethane resin | ELASTRON H-38 | | | | |
| | | ELASTRON E-37 | | | | |
| | Catalyst | ELASTRON CAT-21 | | | | |
| Resin | Urethane resin emulsion | SUPERFLEX ® 420NS solid portion 10 nm | 0.42 | 0.60 | 0.78 | 0.3 |
| | | SUPERFLEX ® 460S solid portion 30 nm | | | | |
| | | SUPERFLEX ® 470 solids portion 50 nm | | | | |
| | | SUPERFLEX ® 150HS solid portion 80 nm | | | | |
| | | SUPERFLEX ® 500M solid portion 140 nm | | | | |
| Organic solvent | Humectant | 1,2-Propanediol | 22.0 | 22.0 | 22.0 | 22.0 |
| | Penetrant (low boiling point) | 3-Methoxy-3-methylbutanol | 22.0 | 22.0 | 22.0 | 22.0 |
| | Penetrant (high boiling point) | 2-Ethyl-1,3-hexanediol | 3.3 | 3.3 | 3.3 | 3.3 |
| Surfactant | Silicone-based surfactant | BYK-345 | 1.0 | 1.0 | 1.0 | 1.0 |
| | Fluorochemical surfactant | FS-34 | | | | |
| Preservative | Anti-oxidant | Benzotriazole | 0.1 | 0.1 | 0.1 | 0.1 |
| Shear thinning agent | Modified ethylene vinyl acetate polymer | AQUATIX8420 solid | 0.0210 | 0.0300 | 0.0390 | 0.0025 |
| | Polyamide amine salt/ aliphatic acid amide | AQH-800 solid portion | | | | |
| | Polyamide | AQ-633E solid portion | | | | 0.076 |
| Water | | Deionized water | Balance | Balance | Balance | Balance |
| | | Total | 100.0 | 100.0 | 100.0 | 100.0 |
| | Properties | Viscosity (mPa · s) | 7 | 7 | 7 | 7 |
| | | R (nm) | 20 | 20 | 20 | 20 |
| | | d (nm) | 20 | 20 | 20 | 20 |
| | | R/d | 1 | 1 | 1 | 1 |
| | Evaluation | 20° gloss | S | S | S | S |
| | | Hue evaluation | S | S | S | B |
| | | Discharging stability | A | A | B | A |
| | | Abrasion resistance | A | B | B | A |

| | | | Example 10 Mt15 | Example 11 Mt16 | Example 12 Mt17 |
|---|---|---|---|---|---|
| | | Silver ink No. | | | |
| | Pigment liquid dispersion | Silver particle (40 percent) BYK-190 (2 percent) liquid dispersion 1 (Mean number diameter 20 nm) | 12.5 | 12.5 | 12.5 |
| | | Tabular silver particle (90 percent) BYK-190 (2 percent) liquid dispersion 2 (Mean number diameter 310 nm d: 50 nm) | | | |
| | | Tabular silver particle (90 percent) BYK-190 (2 percent) liquid dispersion 3 (Mean number diameter 180 nm d: 50 nm) | | | |
| | | Tabular silver particle (90 percent) BYK-190 (2 percent) liquid dispersion 4 (Mean number diameter 130 nm d: 20 nm) | | | |
| | | Concentration (percent) of pigment to total amount of ink | 5 | 5 | 5 |
| Resin | Dispersant | BYK-190 | 0.25 | 0.25 | 0.25 |
| | Water-soluble urethane resin | ELASTRON H-38 | | | |
| | | ELASTRON E-37 | | | |
| | Catalyst | ELASTRON CAT-21 | | | |
| Resin | Urethane resin emulsion | SUPERFLEX ® 420NS solid portion 10 nm | 0.3 | 0.3 | 0.3 |
| | | SUPERFLEX ® 460S solid portion 30 nm | | | |
| | | SUPERFLEX ® 470 solids portion 50 nm | | | |
| | | SUPERFLEX ® 150HS solid portion 80 nm | | | |
| | | SUPERFLEX ® 500M solid portion 140 nm | | | |
| Organic solvent | Humectant | 1,2-Propanediol | 22.0 | 22.0 | 22.0 |
| | Penetrant (low boiling point) | 3-Methoxy-3-methylbutanol | 22.0 | 22.0 | 22.0 |
| | Penetrant (high boiling point) | 2-Ethyl-1,3-hexanediol | 3.3 | 3.3 | 3.3 |
| Surfactant | Silicone-based surfactant | BYK-345 | 1.0 | 1.0 | 1.0 |
| | Fluorochemical surfactant | FS-34 | | | |

TABLE 1-2-continued

| | | | | | |
|---|---|---|---|---|---|
| Preservative | Anti-oxidant | Benzotriazole | 0.1 | 0.1 | 0.1 |
| Shear thinning agent | Modified ethylene vinyl acetate polymer | AQUATIX8420 solid | 0.0050 | 0.0250 | 0.0500 |
| | Polyamide amine salt/ aliphatic acid amide | AQH-800 solid portion | | | |
| | Polyamide | AQ-633E solid portion | 0.076 | | |
| Water | | Deionized water | Balance | Balance | Balance |
| | | Total | 100.0 | 100.0 | 100.0 |
| | Properties | Viscosity (mPa · s) | 7 | 7 | 7 |
| | | R (nm) | 20 | 20 | 20 |
| | | d (nm) | 20 | 20 | 20 |
| | | R/d | 1 | 1 | 1 |
| | Evaluation | 20° gloss | S | S | S |
| | | Hue evaluation | B | B | B |
| | | Discharging stability | A | A | A |
| | | Abrasion resistance | A | A | A |

| | | Silver ink No. | Example 13 Mt18 | Example 14 Mt19 | Example 15 Mt20 |
|---|---|---|---|---|---|
| | Pigment liquid dispersion | Silver particle (40 percent) BYK-190 (2 percent) liquid dispersion 1 (Mean number diameter 20 nm) | 12.5 | 12.5 | 12.5 |
| | | Tabular silver particle (90 percent) BYK-190 (2 percent) liquid dispersion 2 (Mean number diameter 310 nm d: 50 nm) | | | |
| | | Tabular silver particle (90 percent) BYK-190 (2 percent) liquid dispersion 3 (Mean number diameter 180 nm d: 50 nm) | | | |
| | | Tabular silver particle (90 percent) BYK-190 (2 percent) liquid dispersion 4 (Mean number diameter 130 nm d: 20 nm) | | | |
| | | Concentration (percent) of pigment to total amount of ink | 5 | 5 | 5 |
| Resin | Dispersant | BYK-190 | 0.25 | 0.25 | 0.25 |
| | Water-soluble urethane resin | ELASTRON H-38 ELASTRON E-37 | | | |
| | Catalyst | ELASTRON | | | |
| Resin | Urethane resin emulsion | SUPERFLEX® 420NS solid portion 10 nm | 0.3 | 0.3 | 0.3 |
| | | SUPERFLEX® 460S solid portion 30 nm | | | |
| | | SUPERFLEX® 470 solids portion 50 nm | | | |
| | | SUPERFLEX® 150HS solid portion 80 nm | | | |
| | | SUPERFLEX® 500M solid portion 140 nm | | | |
| Organic solvent | Humectant | 1,2-Propanediol | 22.0 | 22.0 | 22.0 |
| | Penetrant (low boiling point) | 3-Methoxy-3-methylbutanol | 22.0 | 22.0 | 22.0 |
| | Penetrant (high boiling point) | 2-Ethyl-1,3-hexanediol | 3.3 | 3.3 | 3.3 |
| Surfactant | Silicone-based surfactant | BYK-345 | 1.0 | 1.0 | 1.0 |
| | Fluorochemical surfactant | FS-34 | | | |
| Preservative | Anti-oxidant | Benzotriazole | 0.1 | 0.1 | 0.1 |
| Shear thinning agent | Modified ethylene vinyl acetate polymer | AQUATIX8420 solid | 0.1500 | 0.3000 | 0.6000 |
| | Polyamide amine salt/ aliphatic acid amide | AQH-800 solid portion | | | |
| | Polyamide | AQ-633E solid portion | | | |
| Water | | Deionized water | Balance | Balance | Balance |
| | | Total | 100.0 | 100.0 | 100.0 |
| | Properties | Viscosity (mPa · s) | 7 | 7 | 7 |
| | | R (nm) | 20 | 20 | 20 |
| | | d (nm) | 20 | 20 | 20 |
| | | R/d | 1 | 1 | 1 |
| | Evaluation | 20° gloss | S | S | S |
| | | Hue evaluation | B | B | B |
| | | Discharging stability | A | A | A |
| | | Abrasion resistance | A | A | A |

TABLE 1-3

| | | Silver ink No. | Example 16 Mt21 | Example 17 Mt22 | Example 18 Mt23 | Example 19 Mt24 |
|---|---|---|---|---|---|---|
| | Pigment liquid dispersion | Silver particle (40 percent) BYK-190 (2 percent) liquid dispersion 1 (Mean number diameter 20 nm) | 12.5 | 12.5 | 12.5 | 12.5 |
| | | Tabular silver particle (90 percent) BYK-190 (2 percent) liquid dispersion 2 (Mean number diameter 310 nm d50 nm) | | | | |
| | | Tabular silver particle (90 percent) BYK-190 (2 percent) liquid dispersion 3 (Mean number diameter 180 nm d: 50 nm) | | | | |
| | | Tabular silver particle (90 percent) BYK-190 (2 percent) liquid dispersion 4 (Mean number diameter 130 nm d: 20 nm) | | | | |
| | | Concentration (percent) of pigment to total amount of ink | 5 | 5 | 5 | 5 |
| Resin | Dispersant | BYK-190 | 0.25 | 0.25 | 0.25 | 0.25 |
| | Water-soluble urethane resin | ELASTRON H-38 | | | | |
| | | ELASTRON E-37 | | | | |
| | Catalyst | ELASTRON CAT-21 | | | | |
| Resin | Urethane resin emulsion | SUPERFLEX ® 420NS solid portion 10 nm | 0.3 | 0.3 | 0.3 | 0.3 |
| | | SUPERFLEX ® 460S solid portion 30 nm | | | | |
| | | SUPERFLEX ® 470 solids portion 50 nm | | | | |
| | | SUPERFLEX ® 150HS solid portion 80 nm | | | | |
| | | SUPERFLEX ® 500M solid portion 140 nm | | | | |
| Organic solvent | Humectant | 1,2-Propanediol | 22.0 | 22.0 | 22.0 | 22.0 |
| | Penetrant (low boiling point) | 3-Methoxy-3-methylbutanol | 22.0 | 22.0 | 22.0 | 22.0 |
| | Penetrant (high boiling point) | 2-Ethyl-1,3-hexanediol | 3.3 | 3.3 | 3.3 | 3.3 |
| Surfactant | Silicone-based surfactant | BYK-345 | 1.0 | 1.0 | 1.0 | 1.0 |
| | Fluorochemical surfactant | FS-34 | | | | |
| Preservative | Anti-oxidant | Benzotriazole | 0.1 | 0.1 | 0.1 | 0.1 |
| Shear thinning agent | Modified ethylene vinyl acetate polymer | AQUATIX8420 solid | | | | |
| | Polyamide amine salt/ aliphatic acid amide | AQH-800 solid | 0.0050 | 0.0150 | 0.0500 | 0.1500 |
| | Polyamide | AQ-633E Solid | 0.076 | | | |
| | Water | Deionized water | Balance | Balance | Balance | Balance |
| | | Total | 100.0 | 100.0 | 100.0 | 100.0 |
| | Properties | Viscosity (mPa · s) | 7 | 7 | 7 | 7 |
| | | R (nm) | 20 | 20 | 20 | 20 |
| | | d (nm) | 20 | 20 | 20 | 20 |
| | | R/d | 1 | 1 | 1 | 1 |
| | Evaluation | 20° gloss | S | S | S | S |
| | | Hue evaluation | B | B | B | B |
| | | Discharging stability | A | A | A | A |
| | | Abrasion resistance | A | A | A | A |

| | | Silver ink No. | Example 20 Mt25 | Example 21 Mt26 | Example 22 Mt27 |
|---|---|---|---|---|---|
| | Pigment liquid dispersion | Silver particle (40 percent) BYK-190 (2 percent) liquid dispersion 1 (Mean number diameter 20 nm) | 12.5 | 12.5 | |
| | | Tabular silver particle (90 percent) BYK-190 (2 percent) liquid dispersion 2 (Mean number diameter 310 nm d:50 nm) | | | |

TABLE 1-3-continued

| | | | | | |
|---|---|---|---|---|---|
| | | Tabular silver particle (90 percent) BYK-190 (2 percent) liquid dispersion 3 (Mean number diameter 180 nm d: 50 nm) | | | 2.8 |
| | | Tabular silver particle (90 percent) BYK-190 (2 percent) liquid dispersion 4 (Mean number diameter 130 nm d: 20 nm) | | | |
| | | Concentration (percent) of pigment to total amount of ink | 5 | 5 | 2.5 |
| Resin | Dispersant | BYK-190 | 0.25 | 0.25 | 0.25 |
| | Water-soluble urethane resin | ELASTRON H-38 ELASTRON E-37 | | | |
| | Catalyst | ELASTRON CAT-21 | | | |
| Resin | Urethane resin emulsion | SUPERFLEX ® 420NS solid portion 10 nm | 0.3 | 0.3 | 0.3 |
| | | SUPERFLEX ® 460S solid portion 30 nm | | | |
| | | SUPERFLEX ® 470 solids portion 50 nm | | | |
| | | SUPERFLEX ® 150HS solid portion 80 nm | | | |
| | | SUPERFLEX ® 500M solid portion 140 nm | | | |
| Organic solvent | Humectant | 1,2-Propanediol | 22.0 | 22.0 | 22.0 |
| | Penetrant (low boiling point) | 3-Methoxy-3-methylbutanol | 22.0 | 22.0 | 22.0 |
| | Penetrant (high boiling point) | 2-Ethyl-1,3-hexanediol | 3.3 | 3.3 | 3.3 |
| Surfactant | Silicone-based surfactant | BYK-345 | 1.0 | 1.0 | 1.0 |
| | Fluorochemical surfactant | FS-34 | | | |
| Preservative | Anti-oxidant | Benzotriazole | 0.1 | 0.1 | 0.1 |
| Shear thinning agent | Modified ethylene vinyl acetate polymer | AQUATIX8420 solid | | | 0.0075 |
| | Polyamide amine salt/ aliphatic acid amide | AQH-800 solid | 0.3000 | 0.6000 | |
| | Polyamide | AQ-633E Solid | | | |
| Water | | Deionized water | Balance | Balance | Balance |
| | | Total | 100.0 | 100.0 | 100.0 |
| | Properties | Viscosity (mPa · s) | 7 | 7 | 7 |
| | | R (nm) | 20 | 20 | 230 |
| | | d (nm) | 20 | 20 | 50 |
| | | R/d | 1 | 1 | 4.6 |
| | Evaluation | 20° gloss | S | A | A |
| | | Hue evaluation | B | B | S |
| | | Discharging stability | A | A | A |
| | | Abrasion resistance | A | A | A |

| | | Silver ink No. | Example 23 Mt28 | Example 24 Mt29 | Example 25 Mt30 |
|---|---|---|---|---|---|
| | Pigment liquid dispersion | Silver particle (40 percent) BYK-190 (2 percent) liquid dispersion 1 (Mean number diameter 20 nm) | | 12.5 | 12.5 |
| | | Tabular silver particle (90 percent) BYK-190 (2 percent) liquid dispersion 2 (Mean number diameter 310 nm d: 50 nm) | | | |
| | | Tabular silver particle (90 percent) BYK-190 (2 percent) liquid dispersion 3 (Mean number diameter 180 nm d: 50 nm) | | | |
| | | Tabular silver particle (90 percent) BYK-190 (2 percent) liquid dispersion 4 (Mean number diameter 130 nm d: 20 nm) | 2.8 | | |
| | | Concentration (percent) of pigment to total amount of ink | 2.5 | 5 | 5 |

TABLE 1-3-continued

| | | | | | |
|---|---|---|---|---|---|
| Resin | Dispersant | BYK-190 | 0.25 | 0.25 | 0.25 |
| | Water-soluble urethane resin | ELASTRON H-38 | | | 0.3 |
| | | ELASTRON E-37 | | | |
| | Catalyst | ELASTRON CAT-21 | | | 0.006 |
| Resin | Urethane resin emulsion | SUPERFLEX ® 420NS solid portion 10 nm | 0.3 | | |
| | | SUPERFLEX ® 460S solid portion 30 nm | | | |
| | | SUPERFLEX ® 470 solids portion 50 nm | | | |
| | | SUPERFLEX ® 150HS solid portion 80 nm | | | |
| | | SUPERFLEX ® 500M solid portion 140 nm | | | |
| Organic solvent | Humectant | 1,2-Propanediol | 22.0 | 22.0 | 22.0 |
| | Penetrant (low boiling point) | 3-Methoxy-3-methylbutanol | 22.0 | 22.0 | 22.0 |
| | Penetrant (high boiling point) | 2-Ethyl-1,3-hexanediol | 3.3 | 3.3 | 3.3 |
| Surfactant | Silicone-based surfactant | BYK-345 | 1.0 | 1.0 | 1.0 |
| | Fluorochemical surfactant | FS-34 | | | |
| Preservative | Anti-oxidant | Benzotriazole | 0.1 | 0.1 | 0.1 |
| Shear thinning agent | Modified ethylene vinyl acetate polymer | AQUATIX8420 solid | 0.0075 | 0.0150 | 0.0150 |
| | Polyamide amine salt/ aliphatic acid amide | AQH-800 solid | | | |
| | Polyamide | AQ-633E Solid | | | |
| Water | | Deionized water | Balance | Balance | Balance |
| | | Total | 100.0 | 100.0 | 100.0 |
| | Properties | Viscosity (mPa · s) | 7 | 7 | 7 |
| | | R (nm) | 180 | 20 | 20 |
| | | d (nm) | 20 | 20 | 20 |
| | | R/d | 9 | 1 | 1 |
| | Evaluation | 20° gloss | S | S | B |
| | | Hue evaluation | B | S | B |
| | | Discharging stability | A | A | A |
| | | Abrasion resistance | A | B | S |

TABLE 1-4

| | | | Example 26 Mt31 | Example 27 Mt32 | Example 28 Mt33 |
|---|---|---|---|---|---|
| | | Silver ink No. | | | |
| Pigment liquid dispersion | | Silver particle (40 percent) BYK-190 (2 percent) liquid dispersion 1 (Mean number diameter 20 nm) | 12.5 | 12.5 | 12.5 |
| | | Tabular silver particle (90 percent) BYK-190 (2 percent) liquid dispersion 2 (Mean number diameter 310 nm d: 50 nm) | | | |
| | | Tabular silver particle (90 percent) BYK-190 (2 percent) liquid dispersion 3 (Mean number diameter 180 nm d: 50 nm) | | | |
| | | Tabular silver particle (90 percent) BYK-190 (2 percent) liquid dispersion 4 (Mean number diameter 130 nm d: 20 nm) | | | |
| | | Concentration (percent) of pigment to total amount of ink | 5 | 5 | 5 |
| Resin | Dispersant | BYK-190 | 0.25 | 0.25 | 0.25 |
| | Water-soluble urethane resin | ELASTRON H-38 | | | |
| | | ELASTRON E-37 | 0.3 | | |
| | Catalyst | ELASTRON CAT-21 | 0.008 | | |
| Resin | Urethane resin emulsion | SUPERFLEX ® 420NS solid portion 10 nm | | | |
| | | SUPERFLEX ® 460S solid portion 30 nm | | 0.3 | |
| | | SUPERFLEX ® 470 solids portion 50 nm | | | 0.3 |
| | | SUPERFLEX ® 150HS solid portion 80 nm | | | |
| | | SUPERFLEX ® 500M solid portion 140 nm | | | |

TABLE 1-4-continued

| | | | | | |
|---|---|---|---|---|---|
| Organic solvent | Humectant | 1,2-Propanediol | 22.0 | 22.0 | 22.0 |
| | Penetrant (low boiling point) | 3-Methoxy-3-methylbutanol | 22.0 | 22.0 | 22.0 |
| | Penetrant (high boiling point) | 2-Ethyl-1,3-hexanediol | 3.3 | 3.3 | 3.3 |
| Surfactant | Silicone-based surfactant | BYK-345 | 1.0 | 1.0 | 1.0 |
| | Fluorochemical surfactant | FS-34 | | | |
| Preservative | Anti-oxidant | Benzotriazole | 0.1 | 0.1 | 0.1 |
| Shear thinning agent | Modified ethylene vinyl acetate polymer | AQUATIX8420 solid | 0.0150 | 0.0150 | 0.0150 |
| | Polyamide aminen salt/ aliphatic acid amide | AQH-800 solid | | | |
| | Polyamide | AQ-633E Solid | | | |
| Water | | Deionized water | Balance | Balance | Balance |
| | | Total | 100.0 | 100.0 | 100.0 |
| | Properties | Viscosity (mPa · s) | 7 | 7 | 7 |
| | | R (nm) | 20 | 20 | 20 |
| | | d (nm) | 20 | 20 | 20 |
| | | R/d | 1 | 1 | 1 |
| | Evaluation | 20° gloss | B | S | S |
| | | Hue evaluation | S | S | S |
| | | Discharging stability | A | A | A |
| | | Abrasion resistance | A | A | B |

| | | Silver ink No. | Example 29 Mt34 | Example 30 Mt35 | Example 31 Mt36 |
|---|---|---|---|---|---|
| | Pigment liquid dispersion | Silver particle (40 percent) BYK-190 (2 percent) liquid dispersion 1 (Mean number diameter 20 nm) | 12.5 | 12.5 | 12.5 |
| | | Tabular silver particle (90 percent) BYK-190 (2 percent) liquid dispersion 2 (Mean number diameter 310 nm d: 50 nm) | | | |
| | | Tabular silver particle (90 percent) BYK-190 (2 percent) liquid dispersion 3 (Mean number diameter 180 nm d: 50 nm) | | | |
| | | Tabular silver particle (90 percent) BYK-190 (2 percent) liquid dispersion 4 (Mean number diameter 130 nm d: 20 nm) | | | |
| | | Concentration (percent) of pigment to total amount of ink | 5 | 5 | 5 |
| Resin | Dispersant | BYK-190 | 0.25 | 0.25 | 0.25 |
| | Water-soluble urethane resin | ELASTRON H-38 | | | |
| | | ELASTRON E-37 | | | |
| | Catalyst | ELASTRON CAT-21 | | | |
| Resin | Urethane resin emulsion | SUPERFLEX ® 420NS solid portion 10 nm | | | 0.3 |
| | | SUPERFLEX ® 460S solid portion 30 nm | | | |
| | | SUPERFLEX ® 470 solids portion 50 nm | | | |
| | | SUPERFLEX ® 150HS solid portion 80 nm | 0.3 | | |
| | | SUPERFLEX ® 500M solid portion 140 nm | | 0.3 | |
| Organic solvent | Humectant | 1,2-Propanediol | 22.0 | 22.0 | 22.0 |
| | Penetrant (low boiling point) | 3-Methoxy-3-methylbutanol | 22.0 | 22.0 | 22.0 |
| | Penetrant (high boiling point) | 2-Ethyl-1,3-hexanediol | 3.3 | 3.3 | 3.3 |
| Surfactant | Silicone-based surfactant | BYK-345 | 1.0 | 1.0 | |
| | Fluorochemical surfactant | FS-34 | | | |

TABLE 1-4-continued

| Preservative | Anti-oxidant | Benzotriazole | 0.1 | 0.1 | 0.1 |
|---|---|---|---|---|---|
| Shear thinning agent | Modified ethylene vinyl acetate polymer | AQUATIX8420 solid | 0.0150 | 0.0150 | 0.0150 |
| | Polyamide amine salt/ aliphatic acid amide | AQH-800 solid | | | |
| | Polyamide | AQ-633E Solid | | | |
| Water | | Deionized water | Balance | Balance | Balance |
| | | Total | 100.0 | 100.0 | 100.0 |
| Properties | | Viscosity (mPa · s) | 7 | 7 | 7 |
| | | R (nm) | 20 | 20 | 20 |
| | | d (nm) | 20 | 20 | 20 |
| | | R/d | 1 | 1 | 1 |
| Evaluation | | 20° gloss | S | S | S |
| | | Hue evaluation | S | S | S |
| | | Discharging stability | A | A | B |
| | | Abrasion resistance | B | B | A |

Example 32

Printed matter was prepared in the same manner as in Example 1 except that the silver ink 1 of Example 1 was printed on a PET film (Lintech E-1000ZC). Ra of the PET film was 5 nm.

The surface roughness Ra of the printed layer was measured. Also, the 20° gloss and the hue were evaluated in the same manner as in Example 1.

The results are shown in Table 2.

TABLE 2

| | Example 1 | Example 32 |
|---|---|---|
| Ink | Mt1 | Mt1 |
| Recording medium | Gloss paper | PET film |
| Recording medium surface roughness Ra (nm) | 11 | 5 |
| Printed layer surface roughness Ra (nm) | 20 | 17 |
| 20° gloss | S | A |
| Color evaluation | S | B |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A recording liquid comprising:
   a metallic luster pigment having a mean number diameter of less than 200 nm, wherein the metallic luster pigment accounts for 1 to 10 percent by mass of the recording liquid; and
   a modified ethylene vinyl acetate polymer or a combination of a polyamide amine salt and an aliphatic acid amide,
   wherein the recording liquid has a viscosity of 40 mPa·s or less at 20 degrees C.

2. The recording liquid according to claim 1, wherein a mass ratio of the modified ethylene vinyl acetate polymer or the combination of a polyamide amine salt and an aliphatic acid amide to 100 parts by mass of the luster pigment is from 0.1 to 6 parts by mass.

3. The recording liquid according to claim 1, wherein the metallic luster pigment comprises a tabular pigment.

4. The recording liquid according to claim 3, wherein a ratio (R/d) of an average particle diameter R to an average thickness d of the tabular pigment is greater than 5, wherein R is obtained as follows:
   each of the tabular pigment in a 10 μm×10 μm photographed image out of a solid image printed with the recording liquid is subject to circle fitting, in which 16 compass points are placed on an outer circumference of a circumcircle of each of the tabular pigment to obtain a particle diameter thereof and calculate an average of the particle diameter as R.

5. The recording liquid according to claim 1, further comprising resin particles having a mean number diameter of from 10 to 50 nm.

6. The recording liquid according to claim 1, further comprising a silicone-based surfactant.

7. Printed matter comprising:
   a recording medium having a surface roughness Ra of 50 nm or less; and
   a printed layer of the recording liquid of claim 1 on the recording medium.

8. The recording liquid according to claim 1, wherein a metal particle of the metallic luster pigment is selected from the group consisting of aluminum, silver, gold, silver, nickel, chromium, tin, zinc, indium, and copper.

* * * * *